(12) United States Patent
Kawasaki et al.

(10) Patent No.: US 11,909,122 B2
(45) Date of Patent: Feb. 20, 2024

(54) MOVING OBJECT MOUNTED RADAR ANTENNA, MODULE FOR MOVING OBJECT MOUNTED RADAR ANTENNA, AND MOVING OBJECT MOUNTED RADAR ANTENNA SYSTEM

(71) Applicant: SONY GROUP CORPORATION, Tokyo (JP)

(72) Inventors: Kenichi Kawasaki, Kanagawa (JP); Takahiro Takeda, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 27 days.

(21) Appl. No.: 17/636,807

(22) PCT Filed: Jul. 15, 2020

(86) PCT No.: PCT/JP2020/027483
§ 371 (c)(1),
(2) Date: Feb. 18, 2022

(87) PCT Pub. No.: WO2021/039172
PCT Pub. Date: Mar. 4, 2021

(65) Prior Publication Data
US 2022/0302577 A1    Sep. 22, 2022

(30) Foreign Application Priority Data

Aug. 26, 2019  (JP) .................................. 2019-153874

(51) Int. Cl.
*H01Q 21/24* (2006.01)
*H01Q 13/02* (2006.01)
(Continued)

(52) U.S. Cl.
CPC ........... *H01Q 21/24* (2013.01); *G01S 13/931* (2013.01); *H01Q 1/273* (2013.01); *H01Q 1/3233* (2013.01);
(Continued)

(58) Field of Classification Search
CPC ...... H01Q 1/2283; H01Q 1/273; H01Q 1/281; H01Q 1/3233; H01Q 1/3283; H01Q 1/38;
(Continued)

(56) References Cited

U.S. PATENT DOCUMENTS

2016/0172761 A1* 6/2016 Garcia ................. G06K 19/077
343/700 MS
2016/0372839 A1    12/2016 Watson et al.
(Continued)

FOREIGN PATENT DOCUMENTS

CN          203013940 U     6/2013
CN          107078404 A     8/2017
(Continued)

OTHER PUBLICATIONS

International Search Report and Written Opinion of PCT Application No. PCT/JP2020/027483, dated Oct. 20, 2020, 08 pages of ISRWO.

*Primary Examiner* — Robert Karacsony
(74) *Attorney, Agent, or Firm* — CHIP LAW GROUP

(57) ABSTRACT

Provided is a moving object mounted radar antenna including an antenna substrate that includes a main flat surface facing an object, a first antenna element that is allowed to receive a polarization component in a first polarization direction parallel to the main flat surface, a second antenna element that is allowed to receive a polarization component in a second polarization direction perpendicular to the main flat surface, and a separation portion that electrically separates the first antenna element and the second antenna
(Continued)

element. Each of the first antenna element, the second antenna element, and the separation portion being provided on the antenna substrate.

19 Claims, 24 Drawing Sheets

(51) Int. Cl.

| | | |
|---|---|---|
| *G01S 13/931* | (2020.01) | |
| *H01Q 1/38* | (2006.01) | |
| *H01Q 9/04* | (2006.01) | |
| *H01Q 9/30* | (2006.01) | |
| *H01Q 1/32* | (2006.01) | |
| *H01Q 21/00* | (2006.01) | |
| *H01Q 21/06* | (2006.01) | |
| *H01Q 1/27* | (2006.01) | |
| *H01Q 21/28* | (2006.01) | |
| *H01Q 1/52* | (2006.01) | |

(52) U.S. Cl.
CPC ............ *H01Q 1/3283* (2013.01); *H01Q 1/38* (2013.01); *H01Q 1/525* (2013.01); *H01Q 9/0407* (2013.01); *H01Q 9/30* (2013.01); *H01Q 13/02* (2013.01); *H01Q 21/005* (2013.01); *H01Q 21/065* (2013.01); *H01Q 21/28* (2013.01); *G01S 2013/93271* (2020.01)

(58) Field of Classification Search
CPC ...... H01Q 1/523; H01Q 1/525; H01Q 9/0407; H01Q 9/30; H01Q 13/02; H01Q 21/005; H01Q 21/064; H01Q 21/065; H01Q 21/24; H01Q 21/28; H01Q 23/00; H01Q 25/001; G01S 13/931; G01S 2013/93271; G02C 11/10
See application file for complete search history.

(56) References Cited

U.S. PATENT DOCUMENTS

2019/0267703 A1\* 8/2019 Koch ................... H01Q 1/3233
2020/0235471 A1\* 7/2020 Pu ............................ H01Q 9/30

FOREIGN PATENT DOCUMENTS

| EP | 3298657 B1 | 4/2020 |
|---|---|---|
| JP | 2007-049691 A | 2/2007 |
| JP | 2011-049864 A | 3/2011 |
| JP | 2018-519737 A | 7/2018 |
| KR | 10-2018-0012855 A | 2/2018 |
| WO | 2016/206388 A1 | 12/2016 |

\* cited by examiner

FIG.10
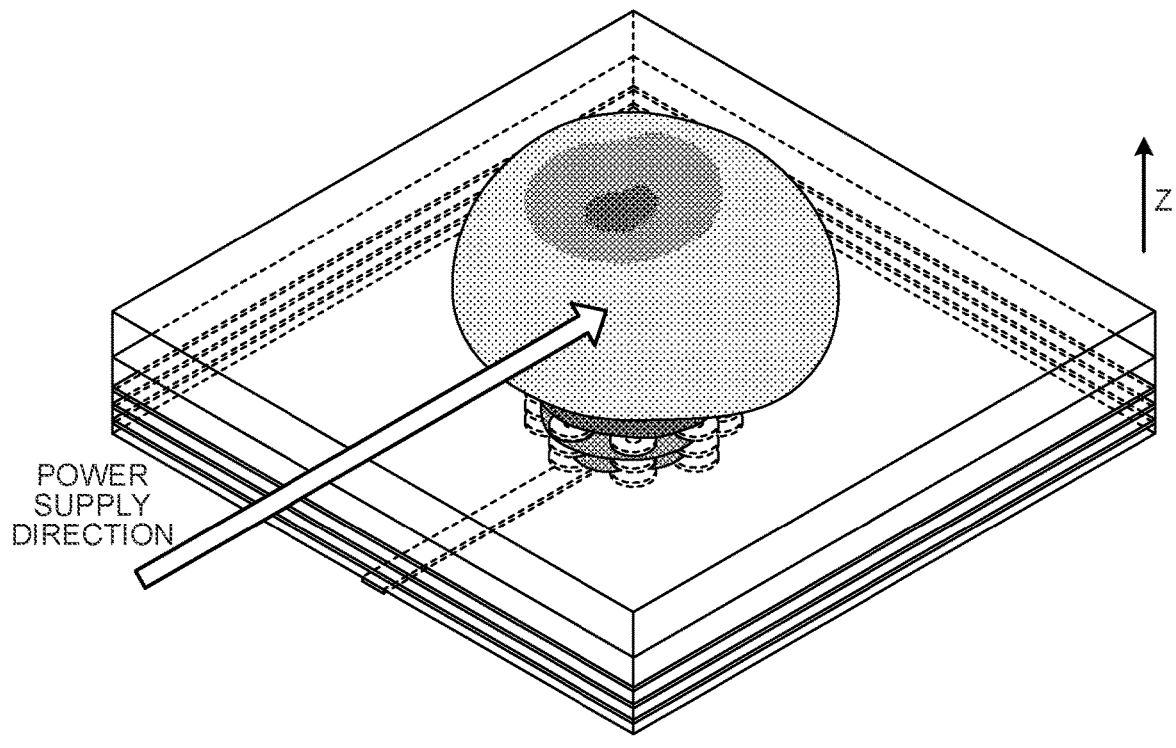
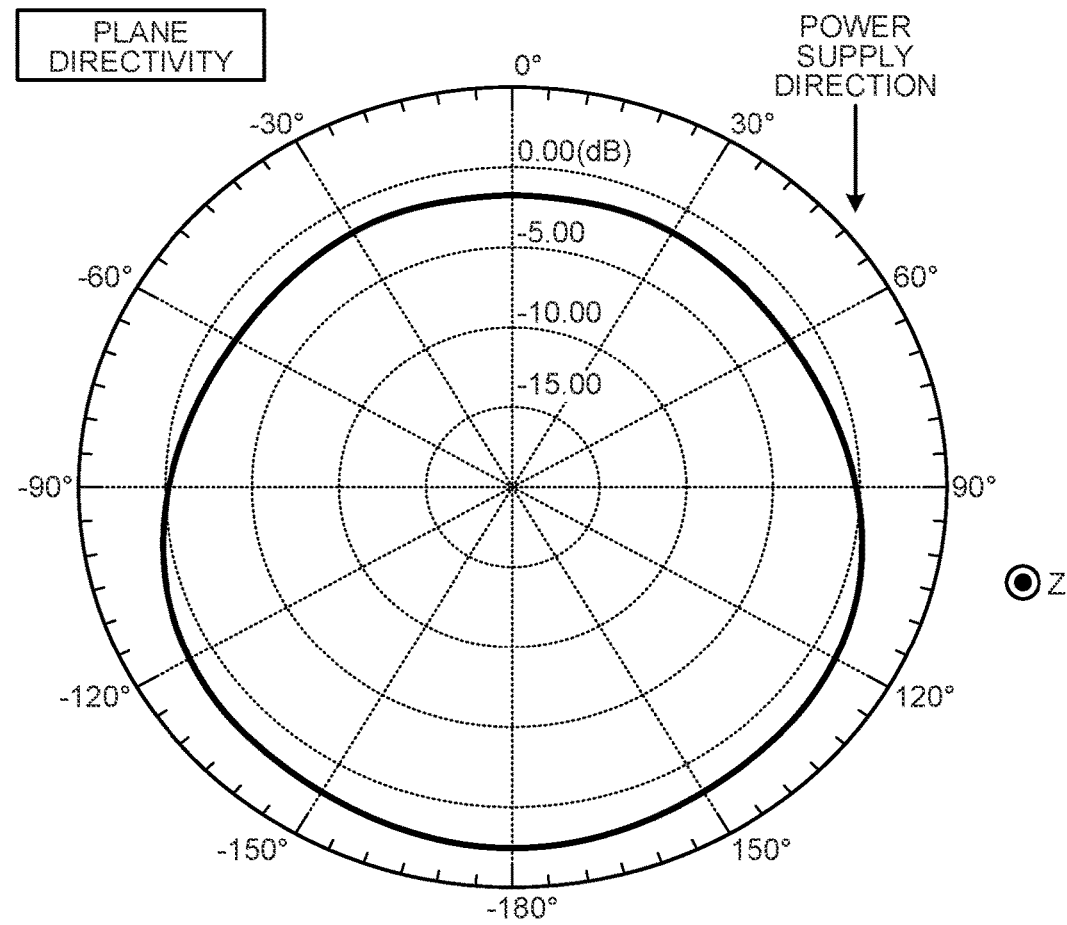

FIG.11
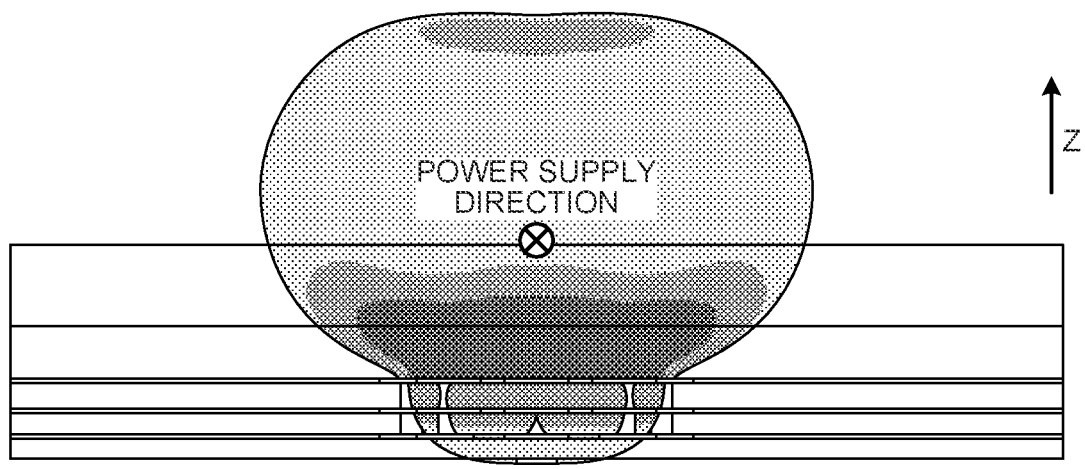
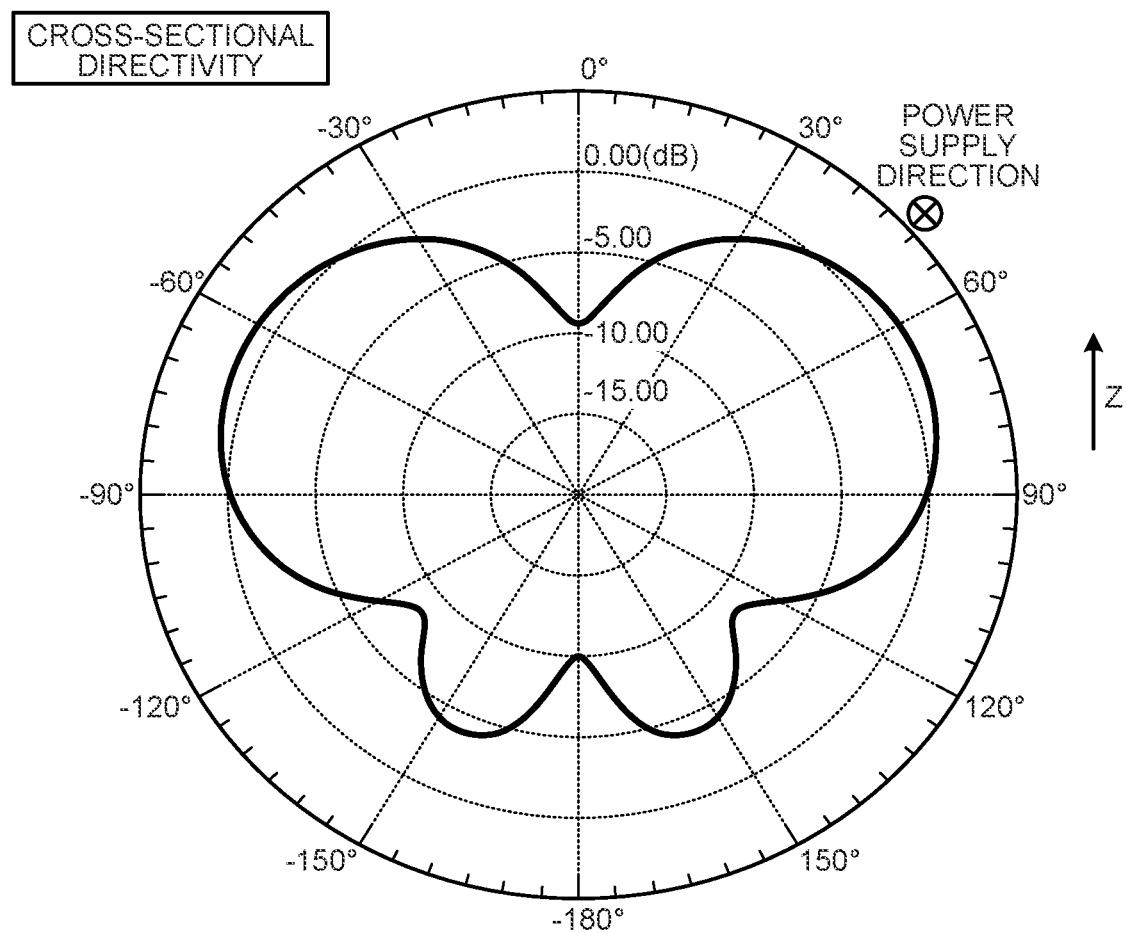

FIG.12
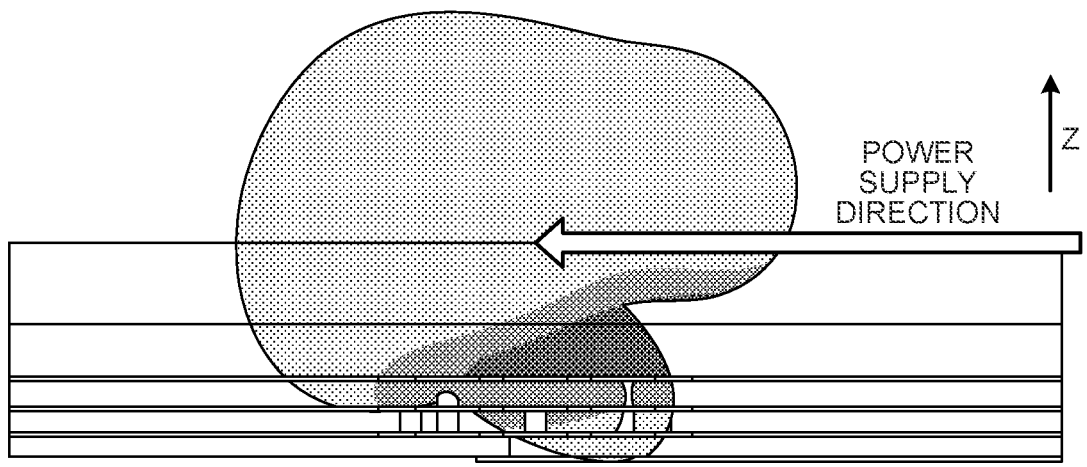
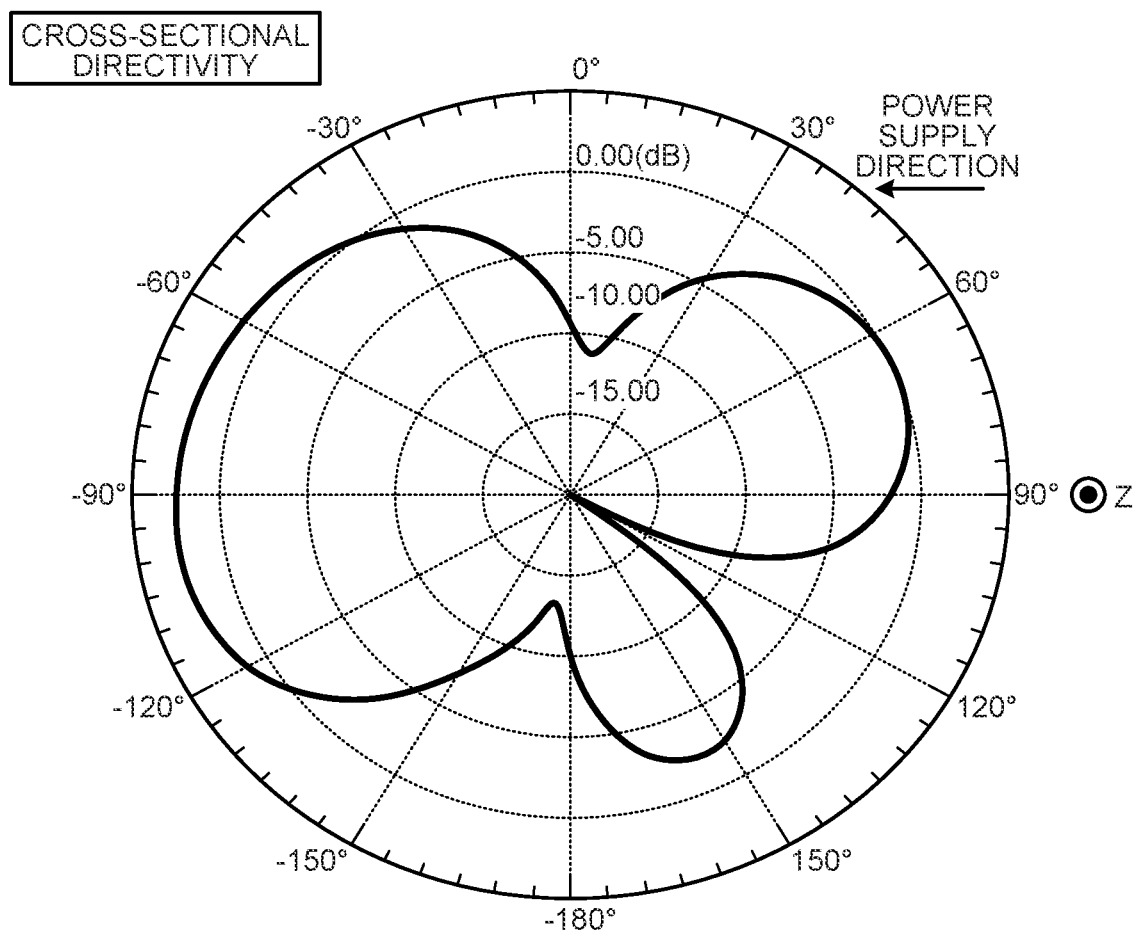

MOVING OBJECT MOUNTED RADAR ANTENNA, MODULE FOR MOVING OBJECT MOUNTED RADAR ANTENNA, AND MOVING OBJECT MOUNTED RADAR ANTENNA SYSTEM

CROSS REFERENCE TO RELATED APPLICATIONS

This application is a U.S. National Phase of International Patent Application No. PCT/JP2020/027483 filed on Jul. 15, 2020, which claims priority benefit of Japanese Patent Application No. JP 2019-153874 filed in the Japan Patent Office on Aug. 26, 2019. Each of the above-referenced applications is hereby incorporated herein by reference in its entirety.

FIELD

The present disclosure relates to a moving object mounted radar antenna, a module for the moving object mounted radar antenna, and a moving object mounted radar antenna system.

BACKGROUND

In recent years, there has been proposed a technique of detecting the position of an obstacle located in front of a vehicle with a radar antenna mounted on the vehicle. Examples of an antenna for detecting an obstacle in a wide range can include a technique disclosed in Patent Literature 1 below.

CITATION LIST

Patent Literature

Patent Literature 1: JP 2007-49691 A

SUMMARY

Technical Problem

Unfortunately, conventional vehicle-mounted radar antennas aim to detect an obstacle far from a vehicle (moving object), and thus have difficulty in accurately grasping the position of the obstacle with respect to the vehicle. Furthermore, in order to detect the azimuth angle of the obstacle with respect to the vehicle, the antenna disclosed in Patent Literature 1 above has a complicated configuration such as an array antenna in which a plurality of antenna elements is linearly arranged.

Then, the present disclosure proposes a moving object mounted radar antenna, a module for the moving object mounted radar antenna, and a moving object mounted radar antenna system capable of accurately detecting the position of an obstacle (object) while having a simple configuration.

Solution to Problem

According to the present disclosure, provided is a moving object mounted radar antenna including: an antenna substrate including a main flat surface facing an object; a first antenna element that is allowed to receive a polarization component in a first polarization direction parallel to the main flat surface; a second antenna element that is allowed to receive a polarization component in a second polarization direction perpendicular to the main flat surface; and a separation portion that electrically separates the first antenna element and the second antenna element, each of the first antenna element, the second antenna element, and the separation portion being provided on the antenna substrate.

Furthermore, according to the present disclosure, provided is a module for a moving object mounted radar antenna that processes a signal from a moving object mounted radar antenna including: an antenna substrate including a main flat surface facing an object; a first antenna element that is allowed to receive a polarization component in a first polarization direction parallel to the main flat surface; a second antenna element that is allowed to receive a polarization component in a second polarization direction perpendicular to the main flat surface; and a separation portion that electrically separates the first antenna element and the second antenna element, the first antenna element, the second antenna element, and the separation portion being provided on the antenna substrate, the module including: a transmission unit that transmits a transmission wave to the object; a first reception unit that receives a polarization component in the first polarization direction of a reflected wave from the object via the first antenna element; a second reception unit that receives a polarization component in the second polarization direction of the reflected wave from the object via the second antenna element; and a signal processing unit that processes a signal for each of the polarization components received at the first reception unit and the second reception unit.

Moreover, according to the present disclosure, provided is a moving object mounted radar antenna system including: a moving object mounted radar antenna including: an antenna substrate including a main flat surface facing an object; a first antenna element that is allowed to receive a polarization component in a first polarization direction parallel to the main flat surface; a second antenna element that is allowed to receive a polarization component in a second polarization direction perpendicular to the main flat surface; and a separation portion that electrically separates the first antenna element and the second antenna element, the first antenna element, the second antenna element, and the separation portion being provided on the antenna substrate; and a module including: a transmission unit that transmits a transmission wave to the object; a first reception unit that receives a polarization component in the first polarization direction of a reflected wave from the object via the first antenna element; a second reception unit that receives a polarization component in the second polarization direction of the reflected wave from the object via the second antenna element; and a signal processing unit that processes a signal for each of the polarization components received at the first reception unit and the second reception unit.

BRIEF DESCRIPTION OF DRAWINGS

FIG. 10 illustrates a simulation result of the plane directivity of the monopole antenna element according to the first embodiment of the present disclosure.

FIG. 11 illustrates a simulation result (part 1) of the cross-sectional directivity of the monopole antenna element according to the first embodiment of the present disclosure.

FIG. 12 illustrates a simulation result (part 2) of the cross-sectional directivity of the monopole antenna element according to the first embodiment of the present disclosure.

DESCRIPTION OF EMBODIMENTS

Figure 1:
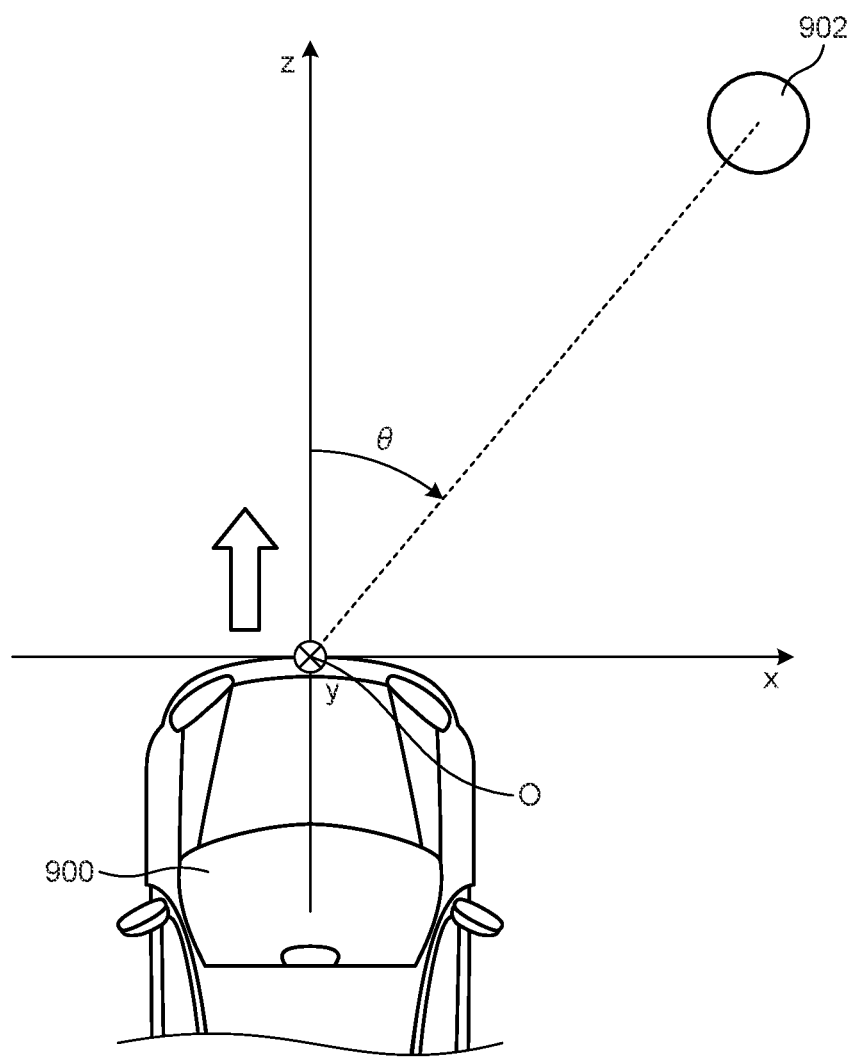
FIG. 1 is an explanatory view illustrating an X-axis direction, a Y-axis direction, and a Z-axis direction.

Hereinafter, preferred embodiments of the present disclosure will be described in detail with reference to the accompanying drawings. Note that, in the present specification and the drawings, components having substantially the same functional configuration are denoted by the same reference signs, and redundant description is omitted. Furthermore, in the present specification and the drawings, similar components may be distinguished by attaching different alphabetical characters after the same reference signs. Note, however, that, when it is unnecessary to particularly distinguish similar components, only the same reference signs are attached.

Furthermore, the drawings referred to in the following description are used for promoting the description and understanding of one embodiment of the present disclosure. The shapes, dimensions, ratios, and the like in the drawings may be different from actual ones for the sake of clarity. The design of antennas and the like in the drawings can be appropriately changed in consideration of the following description and known techniques. Moreover, in the following description, the expression of the shape of an antenna, an electrode, wiring, and the like on a laminate does not mean only a geometrically defined shape, but includes a case where there is an allowable difference in securing the characteristics of the antenna and the like or a shape similar to the shape.

Moreover, in the description of connection of the following configuration, "connection" means electrical connection between a plurality of elements for conveying a signal, unless otherwise specified. Moreover, the "connection" in the following description includes not only direct, electrical connection between the plurality of elements but indirect connection via another element.

In the following description, unless otherwise specified, a moving object can be an automobile, an electric vehicle, a hybrid electric vehicle, a motorcycle, a bicycle, a personal mobility, an airplane, a drone, a ship, a robot (mobile robot), a construction machine, an agricultural machine (tractor), and the like. Therefore, a radar antenna according to the technology of the present disclosure is to be mounted on the above-described various moving objects. Furthermore, the moving object includes a self-moving object such as a person and an animal. In such a case, the radar antenna according to the technology of the present disclosure is to be mounted on a wearable device worn on a body of a person, an animal and the like or a portable device carried by a person.

FIG. 1 is an explanatory view illustrating an X-axis direction, a Y-axis direction, and a Z-axis direction. In the following description, as illustrated in FIG. 1, a traveling direction (specifically, direction extending perpendicularly to main flat surface from center O of main flat surface of radar antenna) of a moving object such as a vehicle 900 is defined as the Z-axis direction. Moreover, a direction extending perpendicularly to the ground from the center O (specifically, center O of main flat surface of radar antenna) of the front of the vehicle 900 toward the ground is defined as the Y-axis direction. A direction extending in parallel to the ground from the center O on the plane of the front is defined as the X-axis direction.

Moreover, in the following description, a vibration direction of an electric field in an electromagnetic wave is referred to as a polarization direction. Specifically, the electromagnetic wave described below includes at least one of a polarization component in the X-axis direction, a polarization component in the Y-axis direction, and a polarization component in the Z-axis direction.

Figure 2:
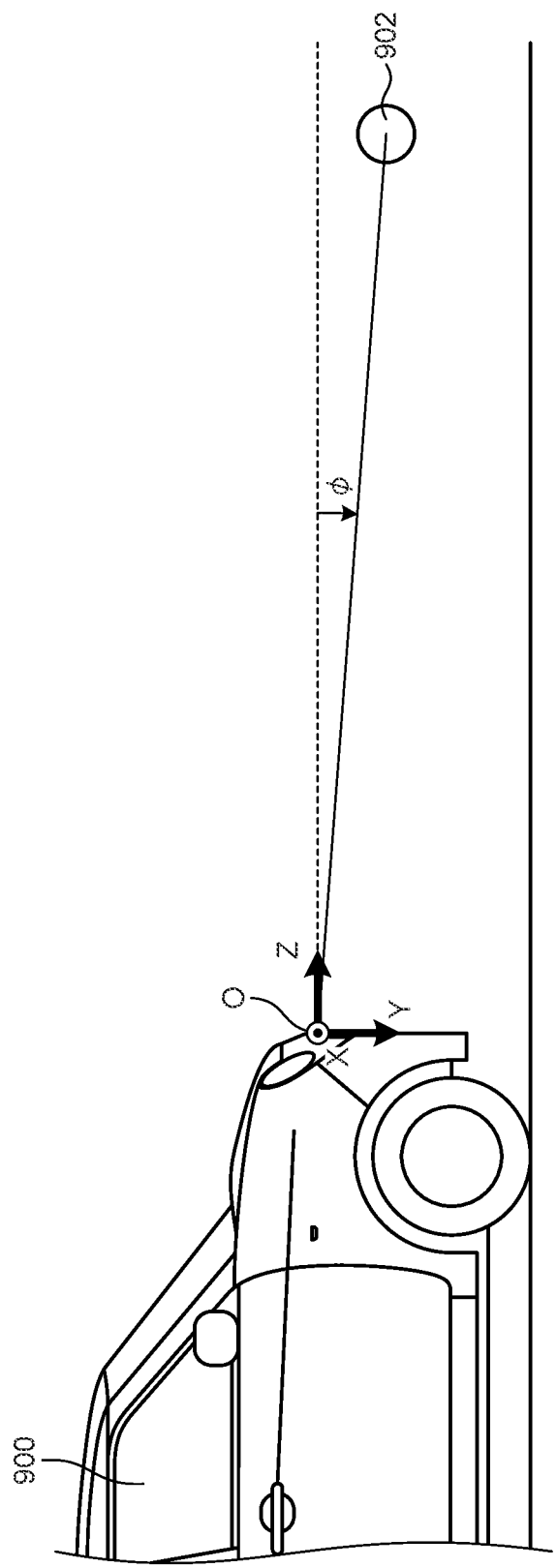
FIG. 2 is an explanatory view illustrating an elevation angle.

In the following description, as illustrated in FIG. 1, an azimuth angle refers to an angle θ formed by a center line (Z-axis in FIG. 1) and a line connecting the center O and an object 902 in a plan view of a moving object such as the vehicle 900 mounted with a radar antenna. The center line penetrates the center O (specifically, center O of main flat surface of antenna substrate in radar antenna installed on the front) of the front of the vehicle 900 along a direction perpendicular to the front (specifically, above-described main flat surface). Furthermore, FIG. 2 is an explanatory view illustrating an elevation angle. As illustrated in FIG. 2, the elevation angle refers to an angle φ formed by the above-described center line (Z-axis in FIG. 2) and the line connecting the center O and the object 902 in view of the above-described vehicle 900 from the side.

Note that the description will be given in the following order.

1. Background in Which Present Inventors Have Created Embodiments According to Present Disclosure
2. Embodiments of Present Disclosure
2.1 Outline
2.2 First Embodiment
2.3 Second Embodiment
2.4 Third Embodiment
3. Application Example
3.1 Moving Object
3.2 Wearable Device
4. Conclusion
5. Supplements

1. Background in Which Present Inventors Have Created Embodiments According to Present Disclosure First, the background in which the present inventors have created embodiments according to the present disclosure will be described. As described above, conventional radar antennas (vehicle-mounted radar antennas) aim to detect the object 902 far from the vehicle (moving object) 900, and thus have difficulty in accurately grasping the position of the object 902 with respect to the vehicle 900. Furthermore, in order to accurately grasp the position of the object 902 with respect to the vehicle 900, a complicated configuration such as an array antenna has been commonly selected. In the array antenna, a plurality of antenna elements is linearly arranged. In such a situation, the present inventors have intensively studied to obtain a radar antenna capable of accurately detecting the position of the object 902 while having a simple configuration.

Then, while continuing the study, the present inventors have focused on the fact that the conventional radar antennas grasp only polarization components in the X-axis direction and the Y-axis direction, and do not independently grasp a polarization component in the Z-axis direction.

Specifically, the conventional radar antennas aim to detect the distance to the object 902 far from the vehicle 900, and thus do not aim to accurately grasp the azimuth angle θ of the object 902 with respect to the vehicle 900. For that reason, the conventional radar antennas are considered as having no necessity to separately grasp the polarization components in the X-axis direction and the Z-axis direction in order to grasp the azimuth angle θ. Furthermore, in order to grasp the azimuth angle θ, the conventional radar antennas estimate the azimuth angle θ by the phase difference between a plurality of antenna elements arranged in the X-axis direction. In this case, the configuration is complicated. In addition, since the azimuth angle θ is grasped by the phase difference, the distance between two adjacent antenna elements is determined by a wavelength, which makes it difficult to make the antenna configuration compact.

Then, the present inventors have thought that, if a radar antenna with a simple configuration can separately grasp polarization components of a plurality of different polarization directions (X-axis direction, Y-axis direction, and Z-axis direction), the position (azimuth angle θ and elevation angle φ) of the object 902 can be accurately detected. That is, the present inventors have created the embodiments of the present disclosure having such an idea as one point of view.

2. Embodiments of Present Disclosure

2.1 Outline

Figure 3:
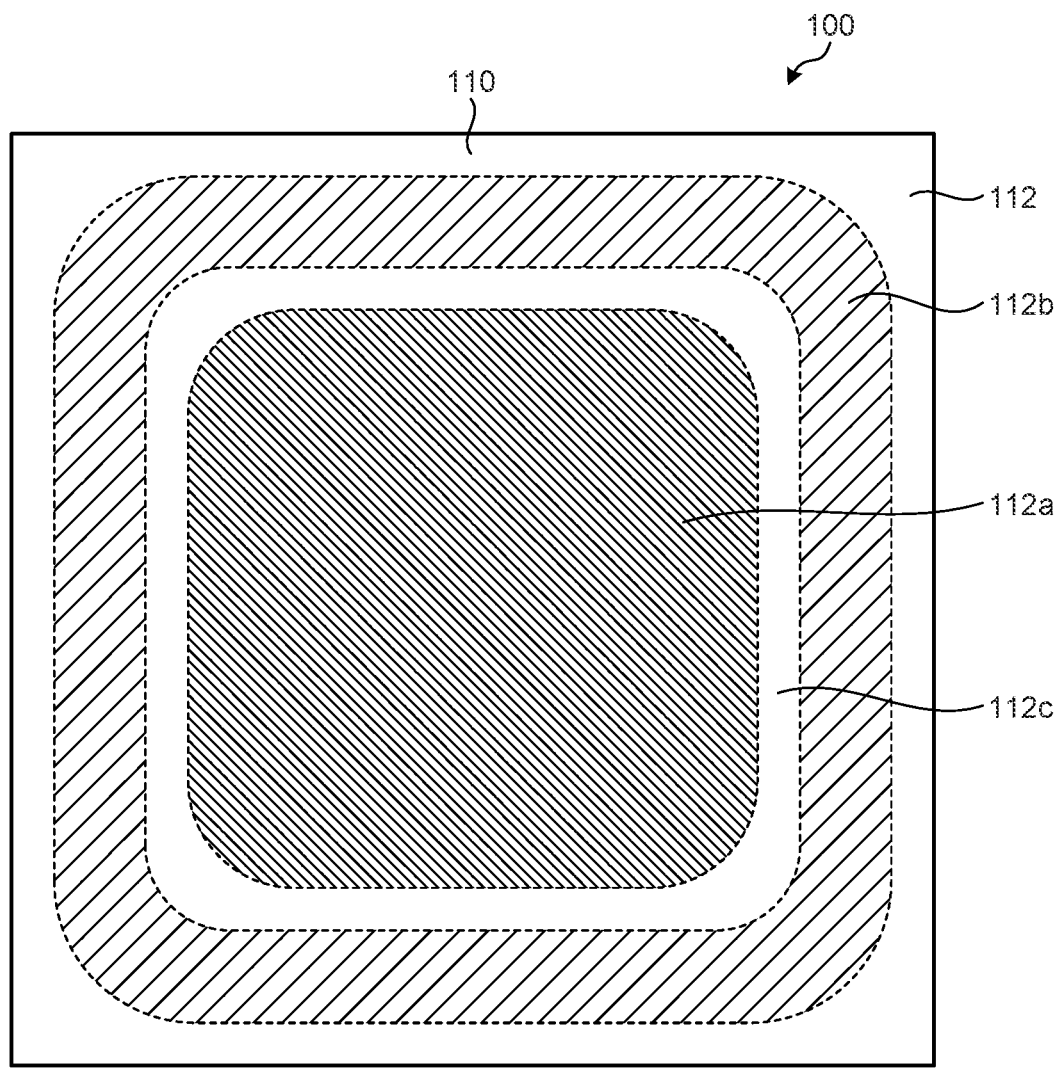
FIG. 3 is a schematic plan view of one example of a radar antenna according to embodiments of the present disclosure.
Figure 4:
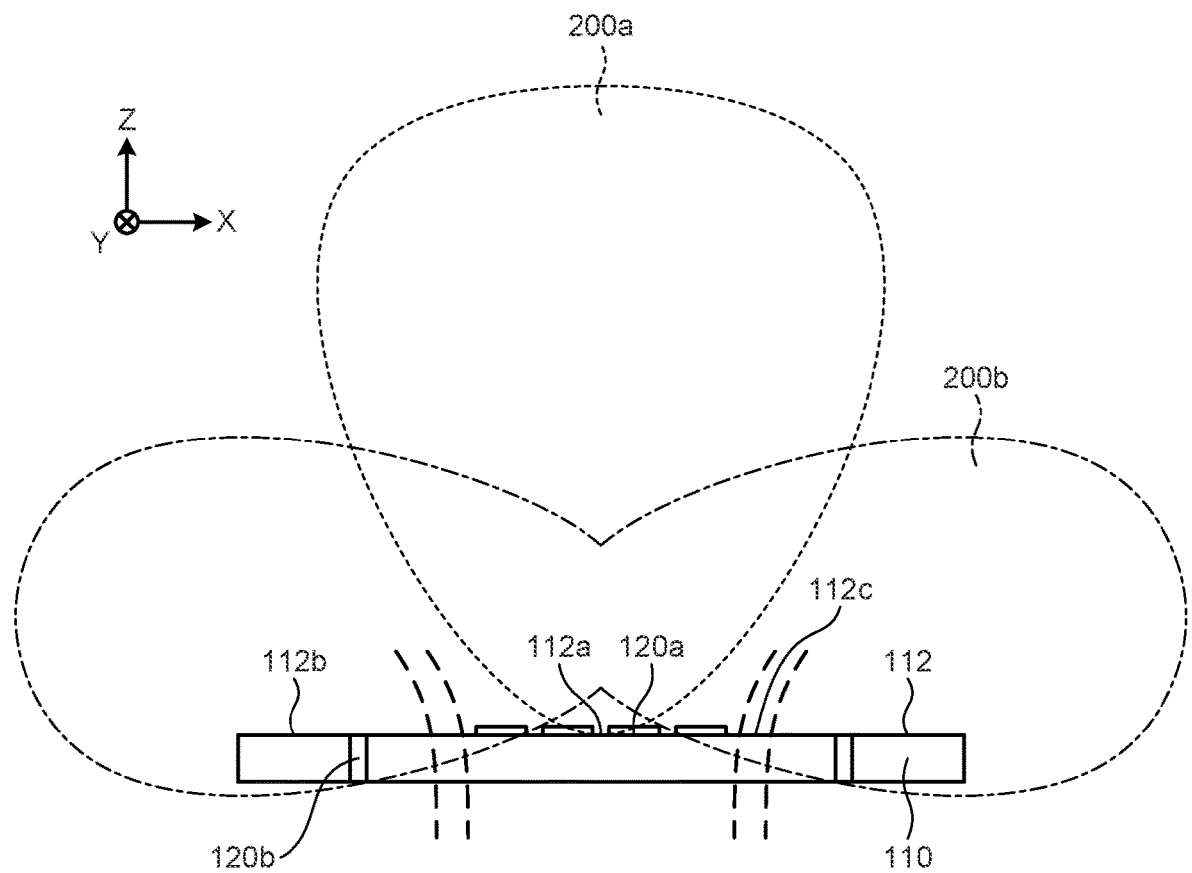
FIG. 4 is a schematic cross-sectional view of one example of the radar antenna according to the embodiments of the present disclosure.
Figure 5:
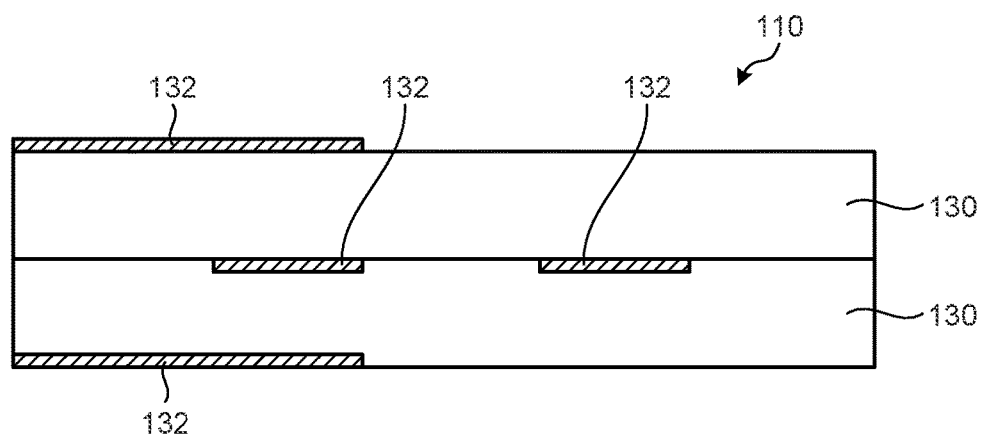
FIG. 5 is a cross-sectional view of one example of an antenna substrate according to the embodiments of the present disclosure.

The embodiments of the present disclosure described below propose a moving object mounted radar antenna capable of separately grasping polarization components in a plurality of different polarization directions (X-axis direction, Y-axis direction, and Z-axis direction) while having a simple configuration. Hereinafter, the embodiments of the present disclosure will be outlined with reference to FIGS. 3 to 5. FIG. 3 is a schematic plan view of one example of a radar antenna according to the embodiments of the present disclosure. FIG. 4 is a schematic cross-sectional view of one example of the radar antenna according to the embodiments of the present disclosure. Furthermore, FIG. 5 is a cross-sectional view of one example of an antenna substrate according to the embodiments of the present disclosure, and specifically, is a cross-sectional view when the antenna substrate is cut along a lamination direction of the antenna substrate.

In the embodiments of the present disclosure, as illustrated in FIGS. 3 and 4, a radar antenna 100 includes an antenna substrate 110, an antenna region (first region) 112a, and an antenna region (second region) 112b. The antenna substrate 110 has a main flat surface 112 facing the object 902. A plurality of antenna elements (first antenna elements) 120a (not illustrated in FIG. 3) is provided in the antenna region 112a. A plurality of antenna elements (second antenna elements) 120b (not illustrated in FIG. 3) is provided in the antenna region 112b. Moreover, in the present embodiments, the radar antenna 100 further includes a separation region (separation portion) 112c that electrically separates the antenna regions 112a and 112b, that is, electrically separates the antenna elements 120a and 120b.

Specifically, the antenna elements 120a can receive polarization components in the X-axis direction and/or the Y-axis direction (first polarization direction parallel to main flat surface 112), and have directivity as indicated by a radiation pattern 200a in FIG. 4. Furthermore, the antenna elements 120b can receive polarization components in the Z-axis direction (second polarization direction perpendicular to main flat surface 112), and have directivity as indicated by a radiation pattern 200b in FIG. 4. Note that details of the antenna elements 120a and 120b will be described later.

Moreover, as illustrated in FIG. 3, the antenna region 112b is located around the antenna region 112a, and the separation region 112c is located between the antenna region 112a and the antenna region 112b on the main flat surface 112. Note that, in the present embodiments, the positional relation between the antenna regions 112a and 112b is not limited to the positional relation as illustrated in FIG. 3. For example, the antenna region 112a may be located around the antenna region 112b as long as the separation region 112c can be provided therebetween.

Moreover, specifically, as illustrated in FIG. 5, the antenna substrate 110 includes at least a dielectric layer 130 and two conductor layers 132. The conductor layers 132 sandwich the dielectric layer 130 from both sides along the thickness direction of the dielectric layer 130. The dielectric layer 130 includes a dielectric material having a relative permittivity of 2 to 3.5, and includes, for example, phenolic resin, epoxy resin, and the like. Furthermore, the conductor layer 132 includes a conductive material such as copper, gold, and aluminum, for example. Moreover, the antenna substrate 110 may be a laminated substrate obtained by laminating a plurality of substrates including the dielectric layer 130 and the two conductor layers 132. The conductor layers 132 sandwich the dielectric layer 130 from both sides along the thickness direction of the dielectric layer 130. Furthermore, the antenna substrate 110 has a thickness of, for example, approximately 0.5 to 1 mm, and the thickness is not particularly limited thereto.

Furthermore, one or a plurality of separation elements 120c (not illustrated in FIGS. 3 and 4) is provided in the separation region 112c. The separation element 120c electrically separates the antenna elements 120a and 120b. In the embodiments of the present disclosure, the separation element 120c can be, for example, a ground via that penetrates a part or the whole of the antenna substrate 110 in the thickness direction of the antenna substrate 110 and that is electrically connected to the ground. Note that, in the embodiments of the present disclosure, the separation element 120c is not particularly limited as long as the separation element 120c can electrically separate the antenna elements 120a and 120b. For example, in the embodiments of the present disclosure, the separation element 120c may be ground wiring electrically connected to the ground, may be an absorption element formed of an absorbent material that absorbs electromagnetic waves, or may be a magnetic element formed of a magnetic substance that acts on an electric field.

Note that the antenna substrate 110 according to the embodiments of the present disclosure is installed on the front of a moving object (e.g., vehicle 900) as described later such that the front and the main flat surface 112 are parallel to each other. In such a case, the Z-axis direction is an advancing direction of the moving object.

In the embodiments of the present disclosure, the separation region 112c electrically separates the antenna elements 120a and the antenna elements 120b. The antenna elements 120a can receive polarization components in the X-axis direction and/or the Y-axis direction. The antenna elements 120b can receive a polarization component in the Z-axis direction. Therefore, the radar antenna 100 according to the present embodiments can separate the antenna elements 120a and 120b with the separation region 112c. The radar antenna 100 further avoids coupling and interference therebetween. The radar antenna 100 thus can easily grasp polarization components in a plurality of different polarization directions (X-axis direction, Y-axis direction, and Z-axis direction) separately.

Then, the radar antenna 100 according to the embodiments of the present disclosure enables a polarization component in the X-axis direction and a polarization component in the Z-axis direction to be separately grasped, so that the azimuth angle θ of the object 902 can be easily estimated. Furthermore, the radar antenna 100 according to the present embodiments enables a polarization component in the Y-axis direction and a polarization component in the Z-axis direction to be separately grasped, so that the elevation angle φ of the object 902 can be easily estimated. Note that details of methods of estimating the azimuth angle θ and the elevation angle φ will be described later.

As a result, according to the embodiments of the present disclosure, polarization components in the X-axis direction, the Y-axis direction, and the Z-axis direction can be separately grasped while the embodiments have simple configurations. The azimuth angle θ and the elevation angle φ of the object 902 can thus be accurately detected. Moreover, according to the embodiments of the present disclosure, the polarization components in the X-axis direction, the Y-axis direction, and the Z-axis direction can be separately grasped, so that an increase in processing load at the time of detecting the position of the object 902 can be inhibited. In addition, according to the embodiments of the present disclosure, a polarization component in the Z-axis direction can be grasped, so that a viewing angle of the radar antenna 100 can be expanded.

Incidentally, in the present embodiments, the radar antenna 100 is not limited to the form in FIGS. 3 and 4. In the present embodiments, for example, the main flat surface 112 of the radar antenna 100 may be provided with the antenna element 120a, the antenna element 120b, and an antenna element (third antenna element) (not illustrated). The antenna element 120a can receive a polarization component in the X-axis direction. The antenna element 120b can receive a polarization component in the Z-axis direction. The antenna element (third antenna element) can receive a polarization component in the Y-axis direction. In this case, the main flat surface 112 may be provided with each of antenna regions including each antenna element, and may be provided with a separation region that separates the antenna regions. Furthermore, in the present embodiments, in such a case, the positional relation between the antenna regions is not particularly limited. Hereinafter, specific examples of the embodiments created by the present inventors will be sequentially described.

2.2 First Embodiment

Figure 6:
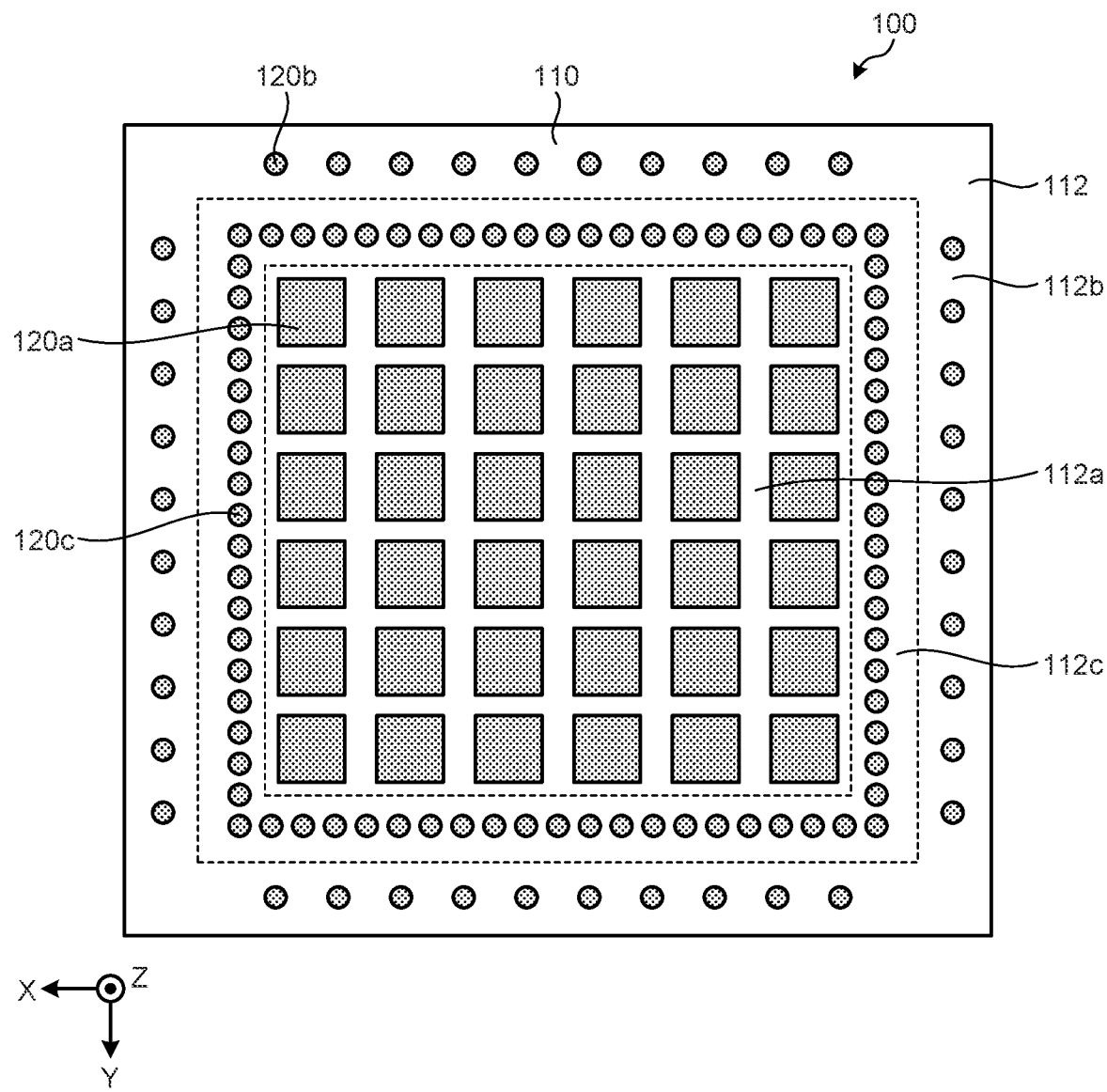
FIG. 6 is a plan view of one example of an antenna substrate according to a first embodiment of the present disclosure.
Figure 7:
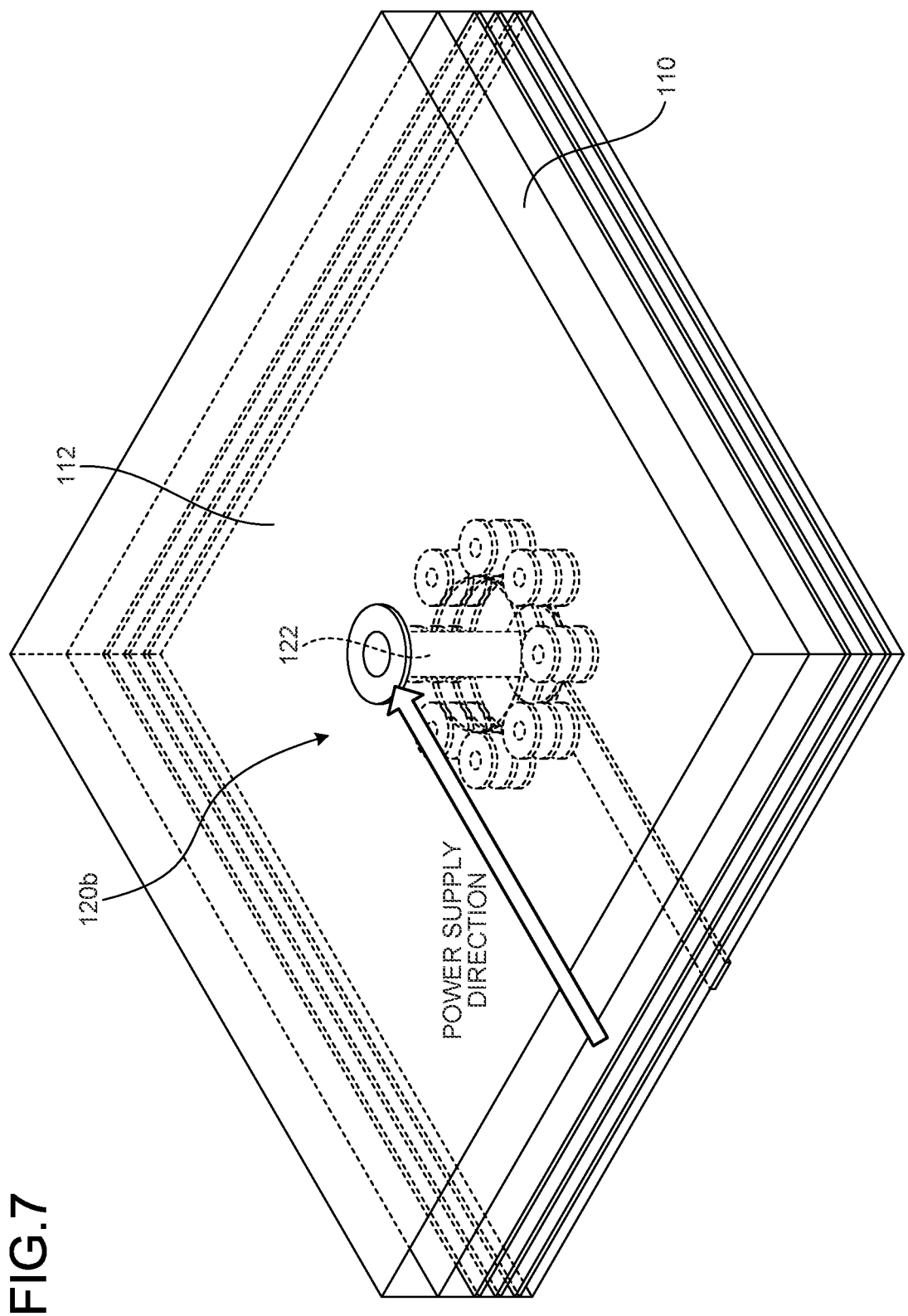
FIG. 7 is a perspective view of one example of a monopole antenna element according to the first embodiment of the present disclosure.
Figure 8:
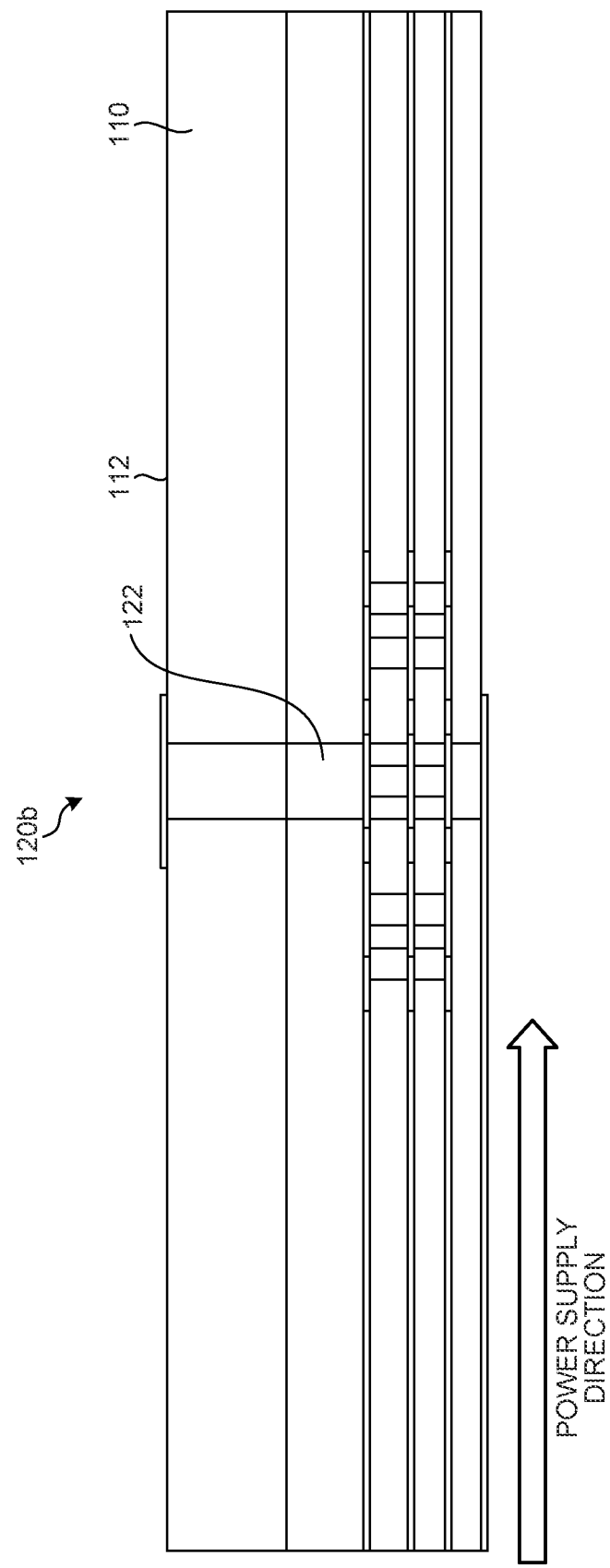
FIG. 8 is a cross-sectional view of one example of the monopole antenna element according to the first embodiment of the present disclosure.
Figure 9:
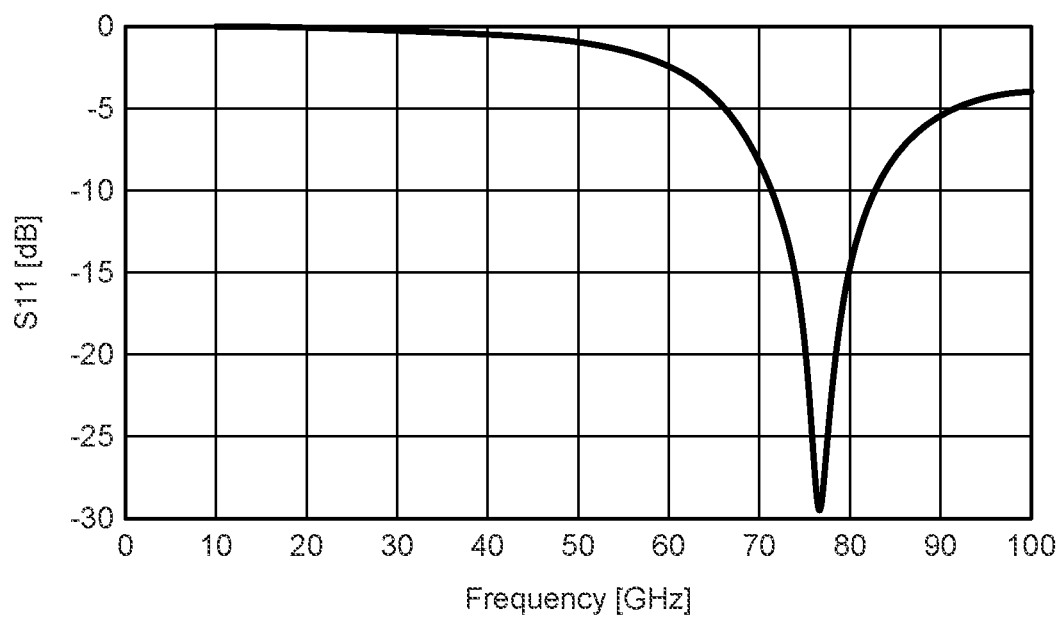
FIG. 9 illustrates a simulation result of reflection characteristics (S11) of the monopole antenna element according to the first embodiment of the present disclosure.

First, a first embodiment of the present disclosure will be described with reference to FIGS. 6 to 12. FIG. 6 is a plan view of one example of an antenna substrate according to the present embodiment. FIG. 7 is a perspective view of one example of a monopole antenna element according to the present embodiment. FIG. 8 is a cross-sectional view of one example of the monopole antenna element according to the present embodiment. FIG. 9 illustrates a simulation result of the reflection characteristics (S11) of the monopole antenna element according to the present embodiment. Furthermore, FIG. 10 illustrates a simulation result of plane directivity of the monopole antenna element according to the present embodiment. Specifically, a perspective view of a radiation pattern of the monopole antenna element according to the present embodiment is provided in the upper part. A result of the plane directivity when the radiation pattern in the upper part is viewed from the above of an antenna substrate 110 is provided in the lower part. FIG. 11 illustrates a simulation result of cross-sectional directivity of the monopole antenna element according to the present embodiment. Specifically, a radiation pattern of the monopole antenna element according to the present embodiment as viewed from a power supply direction is provided in the upper part. A result of the cross-sectional directivity when the radiation pattern in the upper part is cut along the Z-axis direction is provided in the lower part. FIG. 12 illustrates a simulation result of the cross-sectional directivity of the monopole antenna element according to the present embodiment. Specifically, a radiation pattern of the monopole antenna element according to the present embodiment as viewed from a direction perpendicular to the power supply direction is provided in the upper part. A result of the cross-sectional directivity when the radiation pattern in the upper part is cut along the Z-axis direction is provided in the lower part.

In the present embodiment, as illustrated in FIG. 6, the main flat surface 112 of the antenna substrate 110 of the radar antenna 100 is provided with an antenna region 112a. A plurality of antenna elements 120a is provided on the central portion of the antenna region 112a. Furthermore, an antenna region (second region) 112b is provided around the antenna region 112a on a main flat surface 112. A plurality of antenna elements 120b is provided in the antenna region 112b. Moreover, in the present embodiment, as illustrated in FIG. 6, a separation region (separation portion) 112c is provided between the antenna regions 112a and 112b. The separation region 112c includes a plurality of separation elements 120c that electrically separate the antenna elements 120a and 120b. Hereinafter, details of the antenna elements 120a and 120b and the separation element 120c according to the present embodiment will be described.

(Antenna Element 120a)

In the present embodiment, the antenna element 120a can receive polarization components in the X-axis direction and the Y-axis direction. Specifically, the antenna element 120a is a patch antenna element formed by a metal pattern provided on the main flat surface 112. Specifically, as illustrated in FIG. 6, the patch antenna element includes a rectangular metal pattern having sides extending along the X-axis direction and the Y-axis direction on the main flat surface 112. The patch antenna element can receive polarization components not only in the X-axis direction (first polarization direction) but in the Y-axis direction (third polarization direction parallel to main flat surface 112 and orthogonal to X-axis direction).

(Antenna Element 120b)

As described above, the antenna element 120b can receive a polarization component in the Z-axis direction. In the present embodiment, the antenna element 120b includes a monopole antenna element having a via 122 penetrating the antenna substrate 110 along the thickness direction of the antenna substrate 110. For example, as illustrated in FIGS. 7 and 8, the monopole antenna element includes the via 122 having a diameter of 0.1 to 0.3 mm. The via 122 penetrates the antenna substrate 110 having a thickness of approximately 0.5 to 1 mm.

Next, a simulation result of the monopole antenna element according to the present embodiment will be described with reference to FIGS. 9 to 12. Note that the following simulation result is obtained by using existing simulation software capable of analyzing an electromagnetic field based on a model parameter (e.g., relative permittivity, thickness, pattern shape, and length) of the antenna substrate 110. Specifically, the simulation result in FIGS. 9 to 12 was obtained under the conditions of a thickness of 0.84 mm and a relative permittivity of 3.2 to 3.5 of the antenna substrate 110 and a diameter of 0.2 mm of the via 122 of the monopole antenna element.

Under the above-described conditions, as illustrated in the simulation result of the reflection characteristics (S11) of the monopole antenna element according to the present embodiment in FIG. 9, the monopole antenna element according to the present embodiment has good frequency characteristics around 77 GHz. Furthermore, as illustrated in the simulation result of the directivity of the monopole antenna element according to the present embodiment in FIGS. 10 to 12, the monopole antenna element according to the present embodiment has directivity in the Z-axis direction. That is, the monopole antenna element according to the present embodiment can grasp a polarization component in the Z-axis direction having a frequency around 77 GHz.

Note that, when the monopole antenna element capable of grasping a polarization component in the Z-axis direction is formed, a thickness t of the antenna substrate 110 on which the monopole antenna element is to be provided, that is, the penetration length of the via can be expressed by the following expression (1). In the expression (1), λ represents a wavelength, and $\varepsilon_r$ represents a relative permittivity.

$$t = \frac{1}{\sqrt{\varepsilon_r}} \frac{\lambda}{4} \quad (1)$$

As can be seen from the above expression (1), a high target frequency reduces the wavelength λ (e.g., wavelength λ is approximately 3.89 mm in air at 77 GHz), so that the thickness t of the antenna substrate 110 on which the monopole antenna element is provided can be reduced. Therefore, the monopole antenna element according to the present embodiment can further downsize the radar antenna 100 as the target frequency increases.

(Separation Element 120c)

In the present embodiment, as illustrated in FIG. 6, the separation element 120c is, for example, a ground via that penetrates a part or the whole of the antenna substrate 110 in the thickness direction of the antenna substrate 110 and that is electrically connected to the ground.

As described above, according to the present embodiment, polarization components in the X-axis direction, Y-axis direction, and the Z-axis direction can be separately grasped while a simple configuration is achieved. In addition, according to the present embodiment, the polarization component in the Z-axis direction can be grasped, so that a viewing angle of the radar antenna 100 can be expanded.

2.3 Second Embodiment

Figure 13:
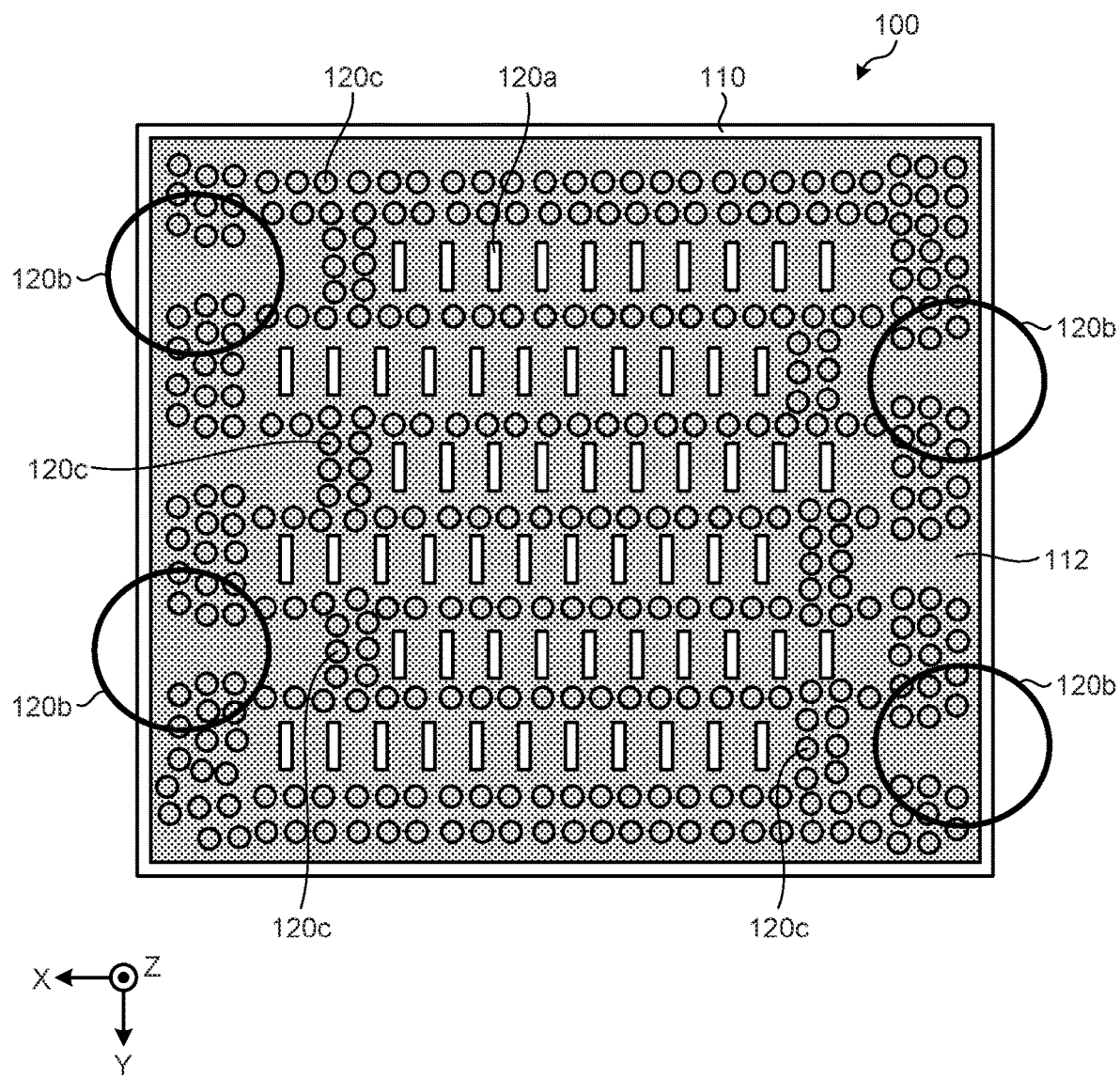
FIG. 13 is a plan view of one example of an antenna substrate according to a second embodiment of the present disclosure.
Figure 14:
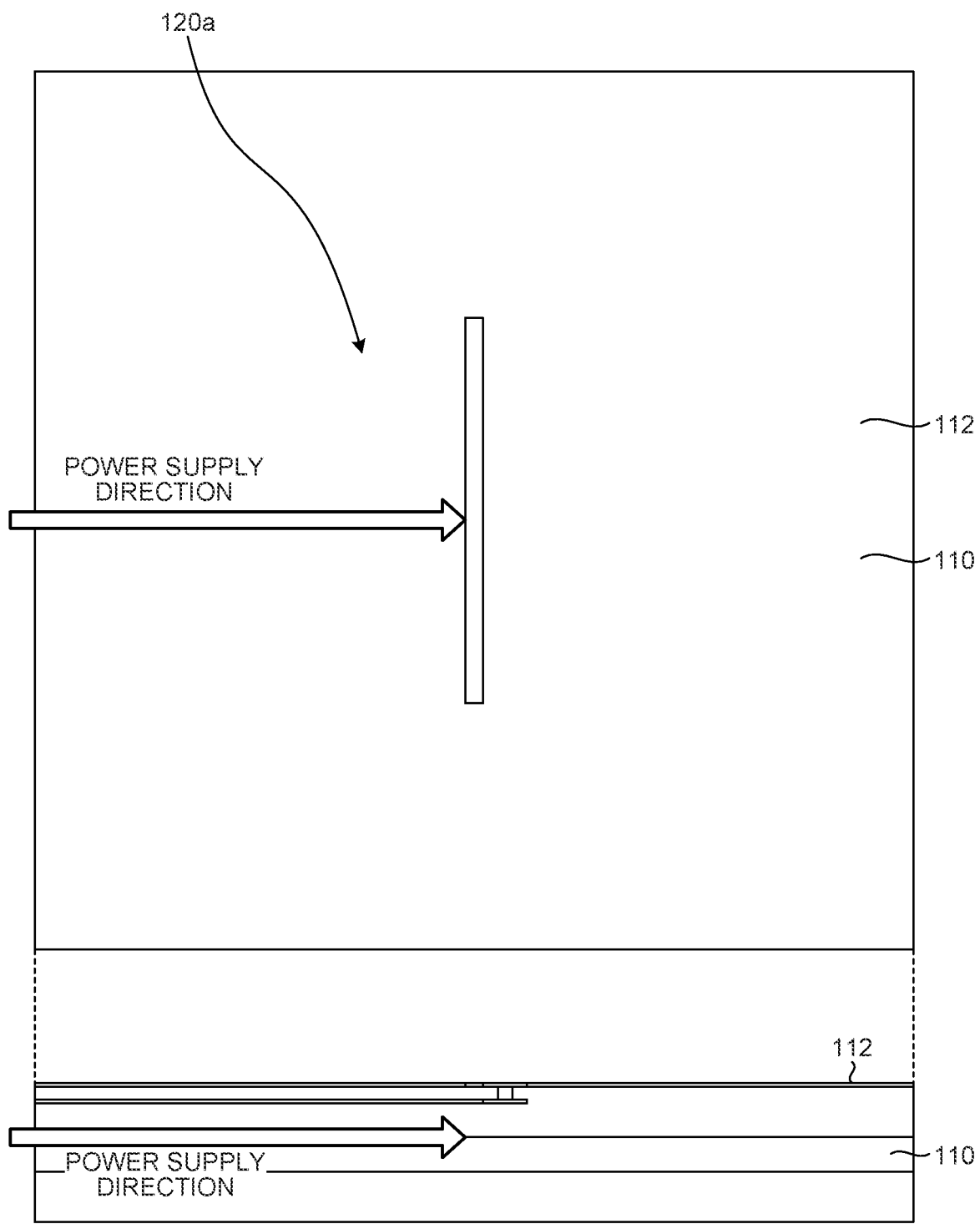
FIG. 14 includes a plan view and a cross-sectional view of one example of a slot antenna element according to the second embodiment of the present disclosure.
Figure 15:
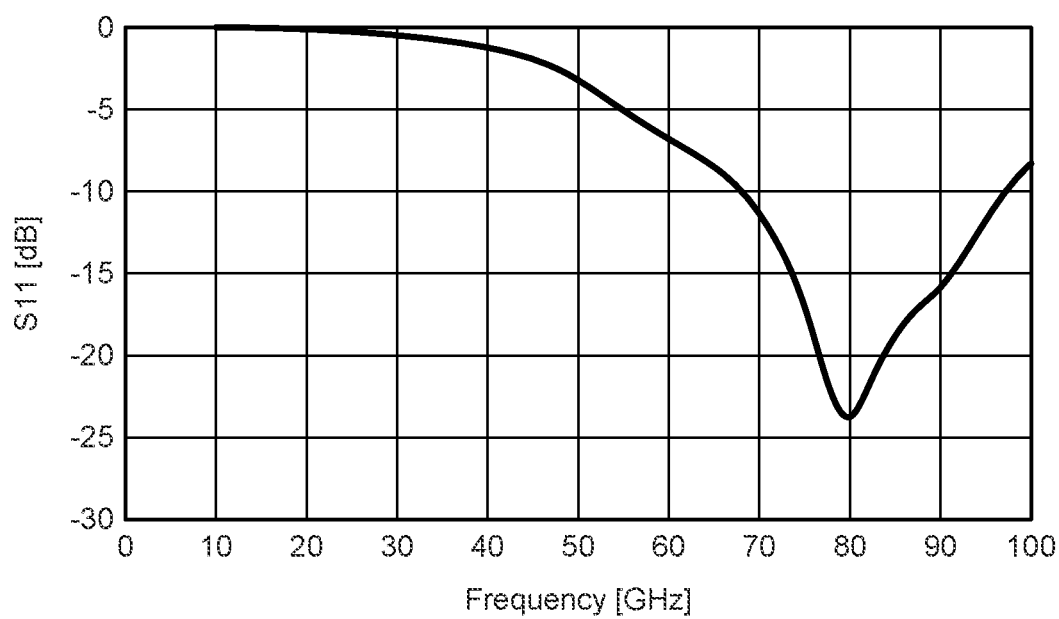
FIG. 15 illustrates a simulation result of the reflection characteristics (S11) of the slot antenna element according to the second embodiment of the present disclosure.
Figure 16:
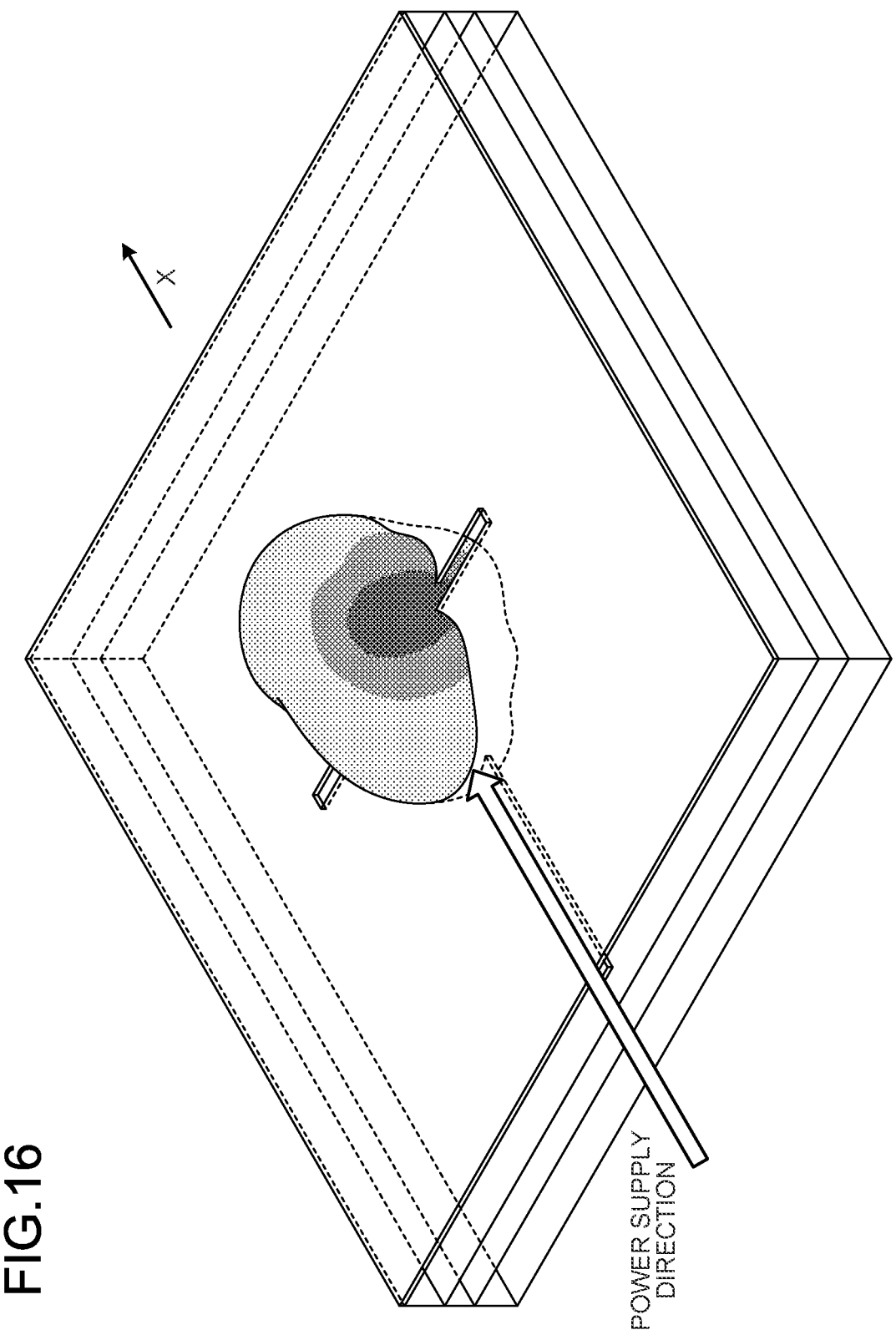
FIG. 16 illustrates a simulation result of the directivity of the slot antenna element according to the second embodiment of the present disclosure.
Figure 17:
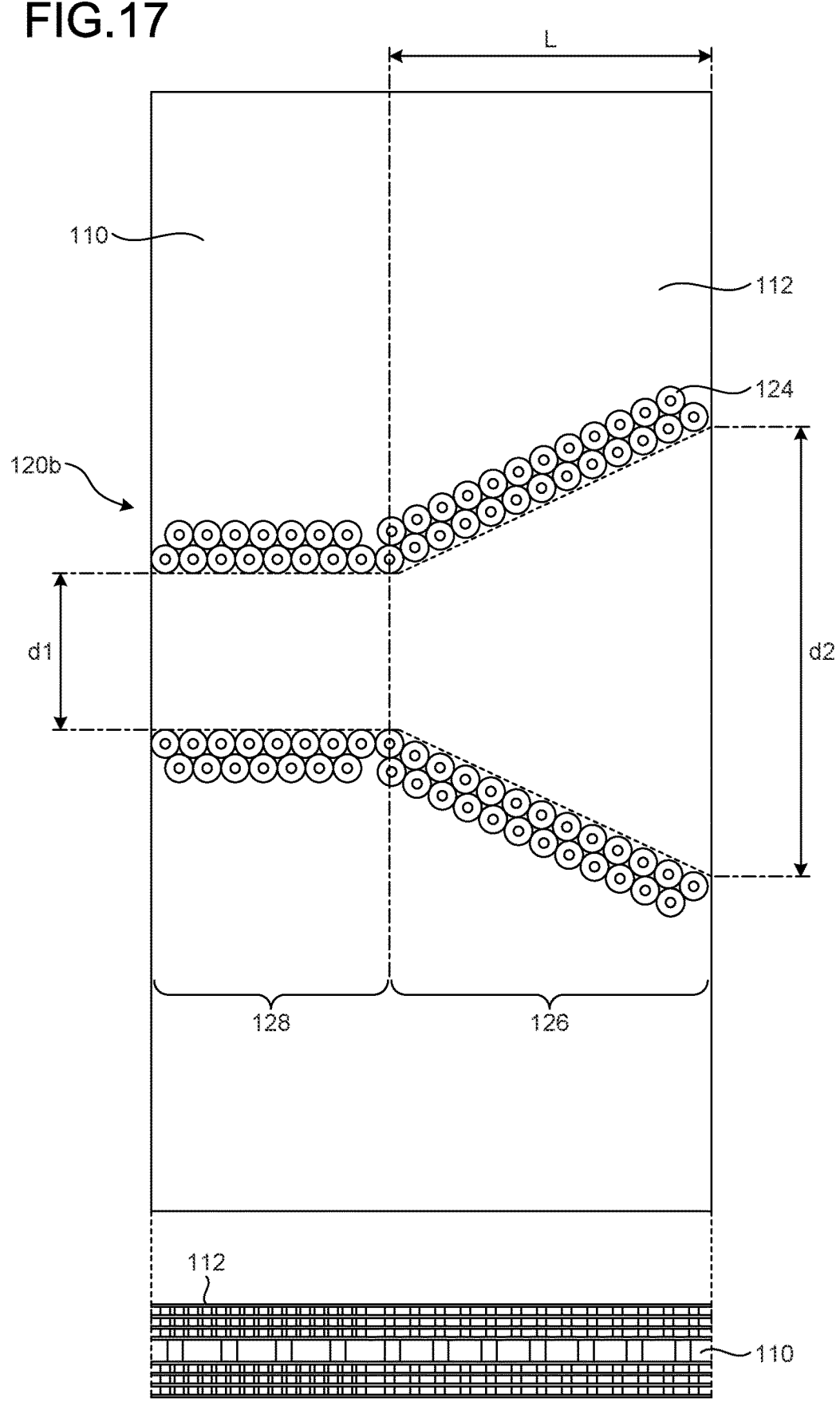
FIG. 17 includes a plan view and a cross-sectional view of one example of a horn antenna element according to the second embodiment of the present disclosure.
Figure 18:
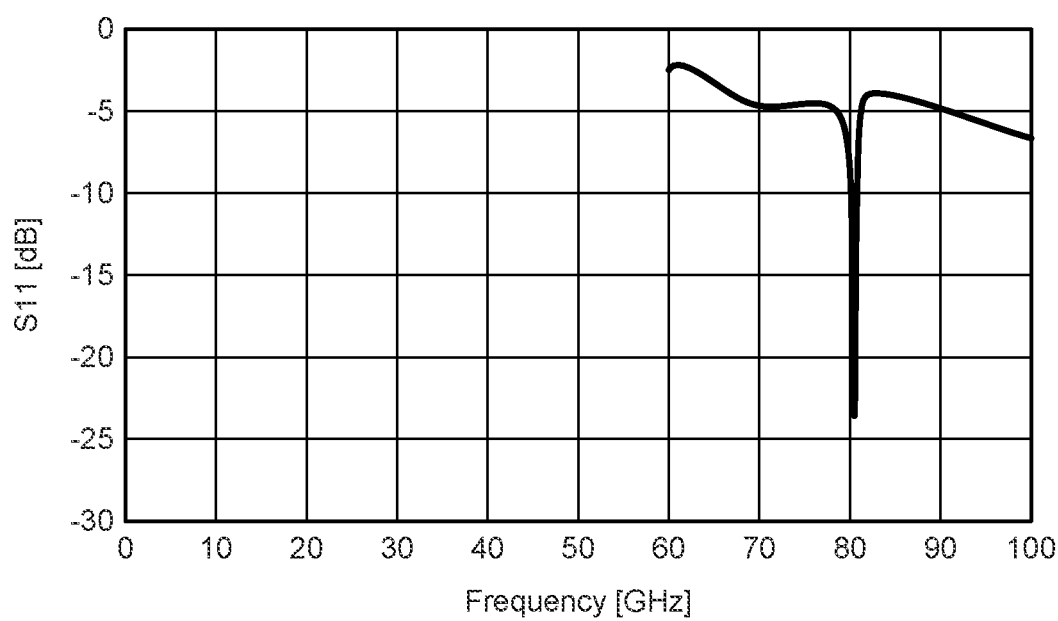
FIG. 18 illustrates a simulation result of the reflection characteristics (S11) of the horn antenna element according to the second embodiment of the present disclosure.
Figure 19:
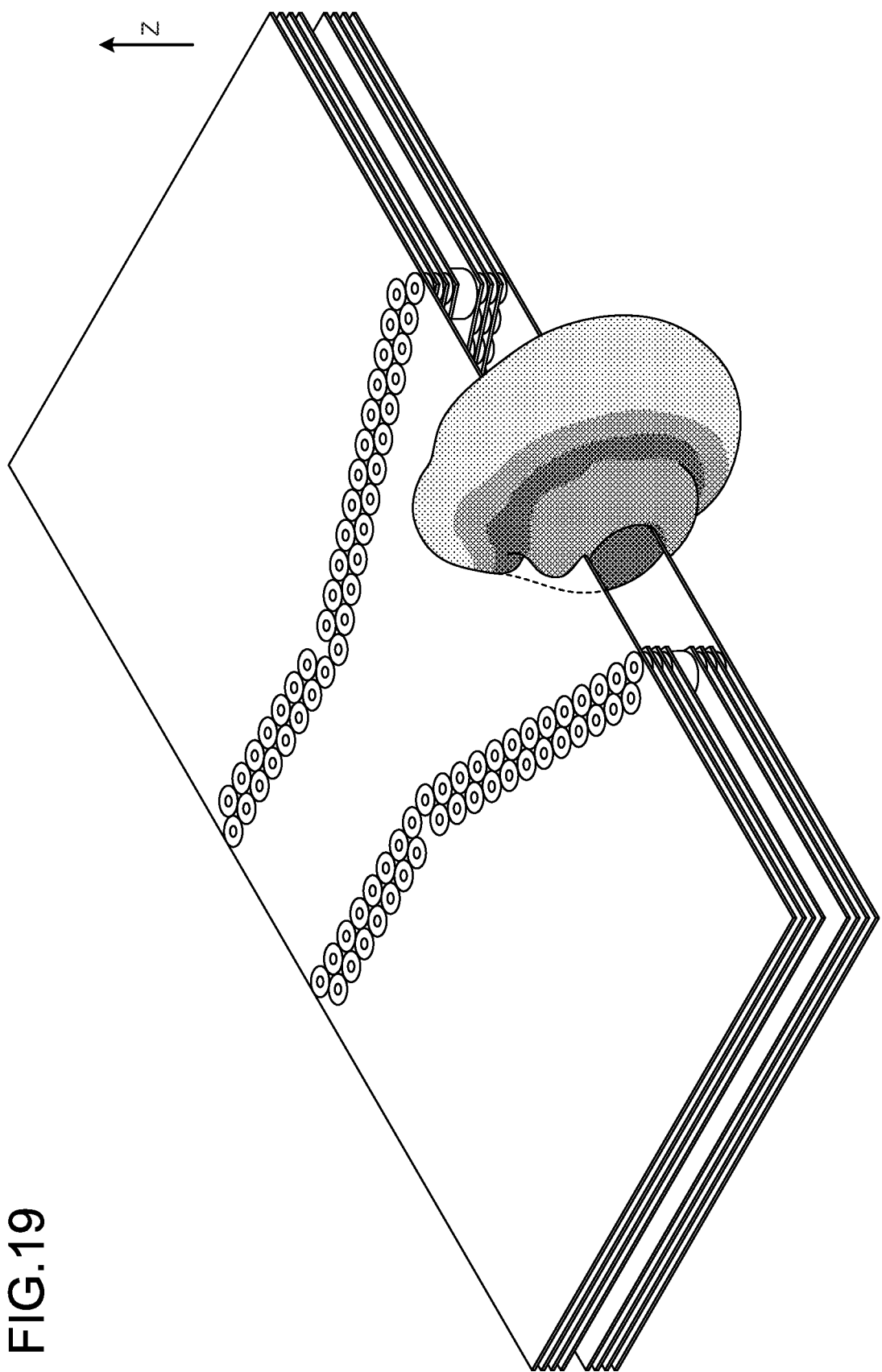
FIG. 19 illustrates a simulation result of the directivity of the horn antenna element according to the second embodiment of the present disclosure.

Next, a second embodiment of the present disclosure will be described with reference to FIGS. 13 to 19. FIG. 13 is a plan view of one example of an antenna substrate according to the present embodiment. FIG. 14 includes a plan view and a cross-sectional view of one example of a slot antenna element according to the present embodiment. Specifically, a plan view is provided in the upper part, and a cross-sectional view is provided in the lower part. FIG. 15 illustrates a simulation result of the reflection characteristics (S11) of the slot antenna element according to the present embodiment. FIG. 16 illustrates a simulation result of the directivity of the slot antenna element according to the present embodiment, and specifically, is a perspective view of a radiation pattern of the slot antenna element according to the present embodiment. FIG. 17 includes a plan view and a cross-sectional view of one example of a horn antenna element according to the present embodiment. Specifically, a plan view is provided in the upper part, and a cross-sectional view is provided in the lower part. FIG. 18 illustrates a simulation result of the reflection characteristics (S11) of the horn antenna element according to the present embodiment. FIG. 19 illustrates a simulation result of the directivity of the horn antenna element according to the present embodiment, and specifically, is a perspective view of a radiation pattern of the horn antenna element according to the present embodiment.

In the present embodiment, as illustrated in FIG. 13, a plurality of antenna elements 120a is provided at the center of a main flat surface 112 of an antenna substrate 110 of a radar antenna 100. A plurality of antenna elements 120b is provided around the plurality of antenna elements 120a. Moreover, the main flat surface 112 is provided with a plurality of separation elements 120c that electrically separate the antenna elements 120a and 120b. Hereinafter, details of the antenna elements 120a and 120b according to the present embodiment will be described. Note that, the separation element 120c is similar to that in the above-described first embodiment, and thus the description thereof will be omitted here in the present embodiment.

(Antenna Element 120a)

In the present embodiment, the antenna element 120a can receive a polarization component in the X-axis direction. Specifically, as illustrated in FIG. 14, the antenna element 120a is a slot antenna element having a slot extending along the Y-axis direction (direction perpendicular to first polarization direction) in the main flat surface 112. Specifically, the slot antenna element has a slot having a width of approximately 0.1 mm and a length of approximately 2.2 mm.

Next, a simulation result of the slot antenna element according to the present embodiment will be described with reference to FIGS. 15 and 16. Note that the following simulation result is obtained by using existing simulation software capable of analyzing an electromagnetic field based on a model parameter (e.g., relative permittivity, thickness, pattern shape, and length) of the antenna substrate 110. Specifically, the simulation result in FIGS. 15 and 16 was obtained under the conditions of a thickness of 0.84 mm and a relative permittivity of 3.2 to 3.5 of the antenna substrate 110 as well as a width of 0.1 mm and a length of 2.2 mm of the slot of the slot antenna element.

Under the above-described conditions, as illustrated in the simulation result of the reflection characteristics (S11) of the slot antenna element according to the present embodiment in FIG. 15, the slot antenna element according to the present embodiment has good frequency characteristics around 77 GHz. Furthermore, as illustrated in the simulation result of the directivity of the slot antenna element according to the present embodiment in FIG. 16, the monopole antenna element according to the present embodiment has directivity in the X-axis direction. That is, the slot antenna element according to the present embodiment can grasp a polarization component in the X-axis direction having a frequency around 77 GHz.

(Antenna Element 120b)

As described above, the antenna element 120b can receive a polarization component in the Z-axis direction. In the present embodiment, the antenna element 120b can be a substrate integrated waveguide (SIW) antenna element including a metal pattern, a via, and the like. The metal pattern is provided on the main flat surface 112. The via penetrates a part or the whole of the antenna substrate 110. More specifically, in the present embodiment, as illustrated in FIG. 17, the antenna element 120b is a horn antenna element formed by a plurality of vias (patterns) 124 arranged in a horn shape on the main flat surface 112.

Specifically, the horn antenna element includes a horn portion 126 and a waveguide portion 128. The horn portion 126 is formed by arranging a plurality of vias 124 on the main flat surface 112 in a trumpet (horn) shape. The waveguide portion 128 is formed by arranging a plurality of vias 124 on the main flat surface 112 in parallel to each other. For example, the horn portion 126 can have a length L of approximately 2.8 mm. A portion at which the horn portion 126 and the waveguide portion 128 are connected can have a width d1 of approximately 1.4 mm. A widened end portion of the horn portion 126 can have a width d2 of approximately 4 mm.

Next, a simulation result of the horn antenna element according to the present embodiment will be described with reference to FIGS. 18 and 19. Note that the following simulation result is obtained by using existing simulation software capable of analyzing an electromagnetic field based on a model parameter (e.g., relative permittivity, thickness, pattern shape, and length) of the antenna substrate 110. Specifically, the simulation result in FIGS. 18 and 19 was obtained under the conditions of the thickness of 0.84 mm and the relative permittivity of 3.2 to 3.5 of the antenna substrate 110, the length L of 2.8 mm of the horn portion 126 of the horn antenna element, the width d1 of 1.4 mm of a portion at which the horn portion 126 and the waveguide portion 128 are connected, and the width d2 of approximately 4 mm of the widened end portion of the horn portion 126.

Under the above-described conditions, as illustrated in the simulation result of the reflection characteristics (S11) of the horn antenna element according to the present embodiment in FIG. 18, the horn antenna element according to the present embodiment has good frequency characteristics around 80 GHz. Furthermore, as illustrated in the simulation result of the directivity of the horn antenna element according to the present embodiment in FIG. 19, the horn antenna element according to the present embodiment has directivity in the Z-axis direction. That is, the horn antenna element according to the present embodiment can grasp a polarization component in the Z-axis direction having a frequency around 80 GHz.

As described above, according to the present embodiment, polarization components in the X-axis direction and the Z-axis direction can be separately grasped while a simple configuration is achieved. In addition, according to the present embodiment, the polarization component in the Z-axis direction can be grasped, so that a viewing angle of the radar antenna 100 can be expanded.

(Variations)

Note that, in the present embodiment, a slot antenna element (third antenna element) (not illustrated) may be provided. The slot antenna element includes a slot extending along the X-axis direction (first polarization direction) in the main flat surface 112. The slot antenna element is parallel to the main flat surface 112, and can function as an antenna element capable of receiving a polarization component in the Y-axis direction (third polarization direction orthogonal to first polarization direction). In this case, a separation region (not illustrated) that electrically separates the slot antenna element and the above-described antenna elements 120a and 120b is preferably further provided.

2.4 Third Embodiment

Figure 20:
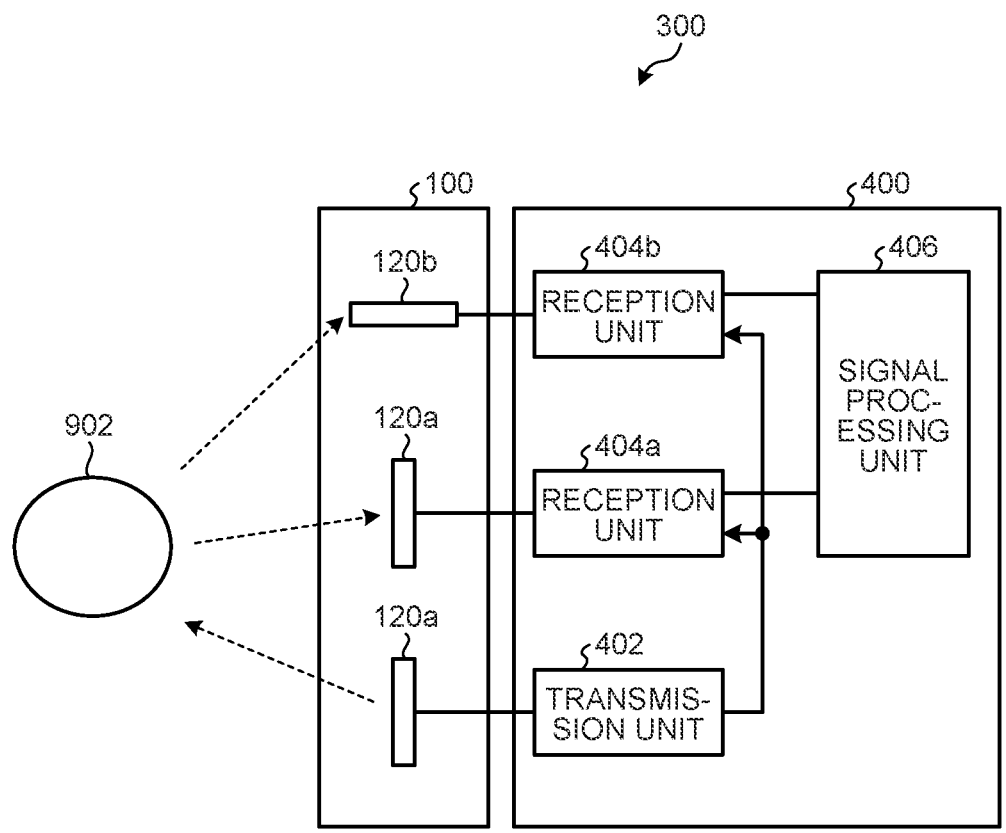
FIG. 20 is a block diagram of a system according to a third embodiment of the present disclosure.
Figure 21:
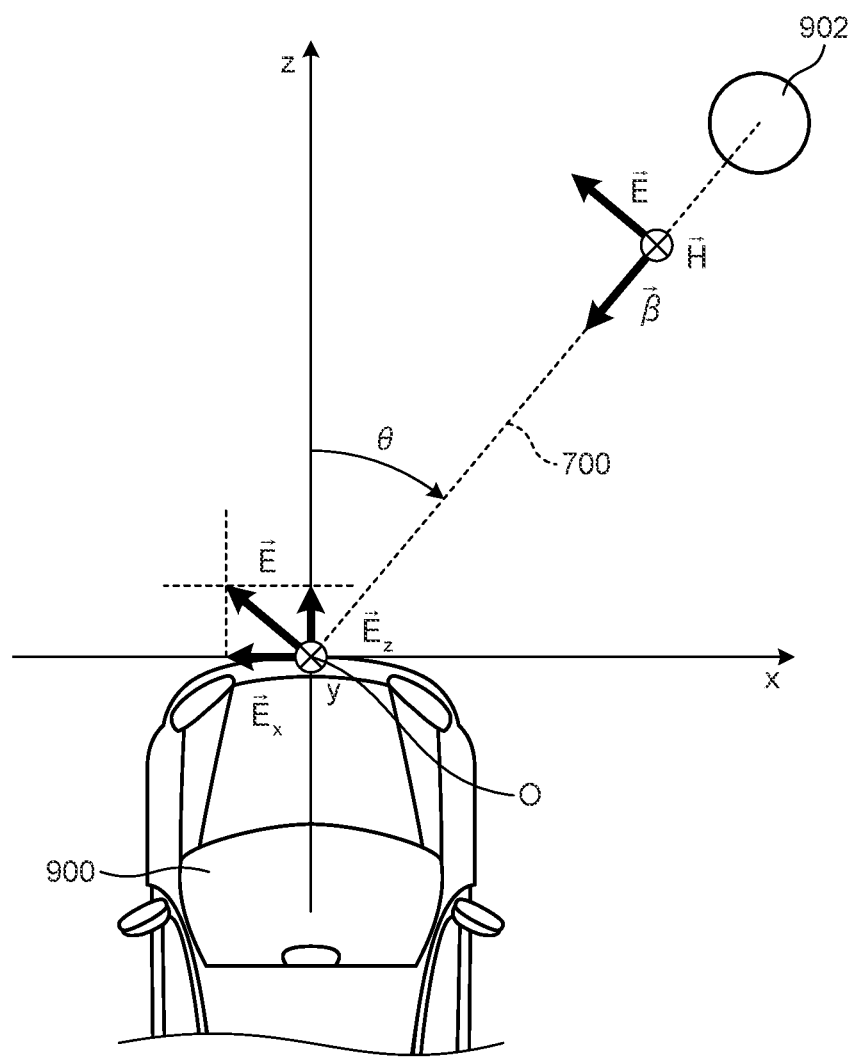
FIG. 21 is an explanatory view illustrating a method of estimating an azimuth angle according to the third embodiment of the present disclosure.
Figure 22:
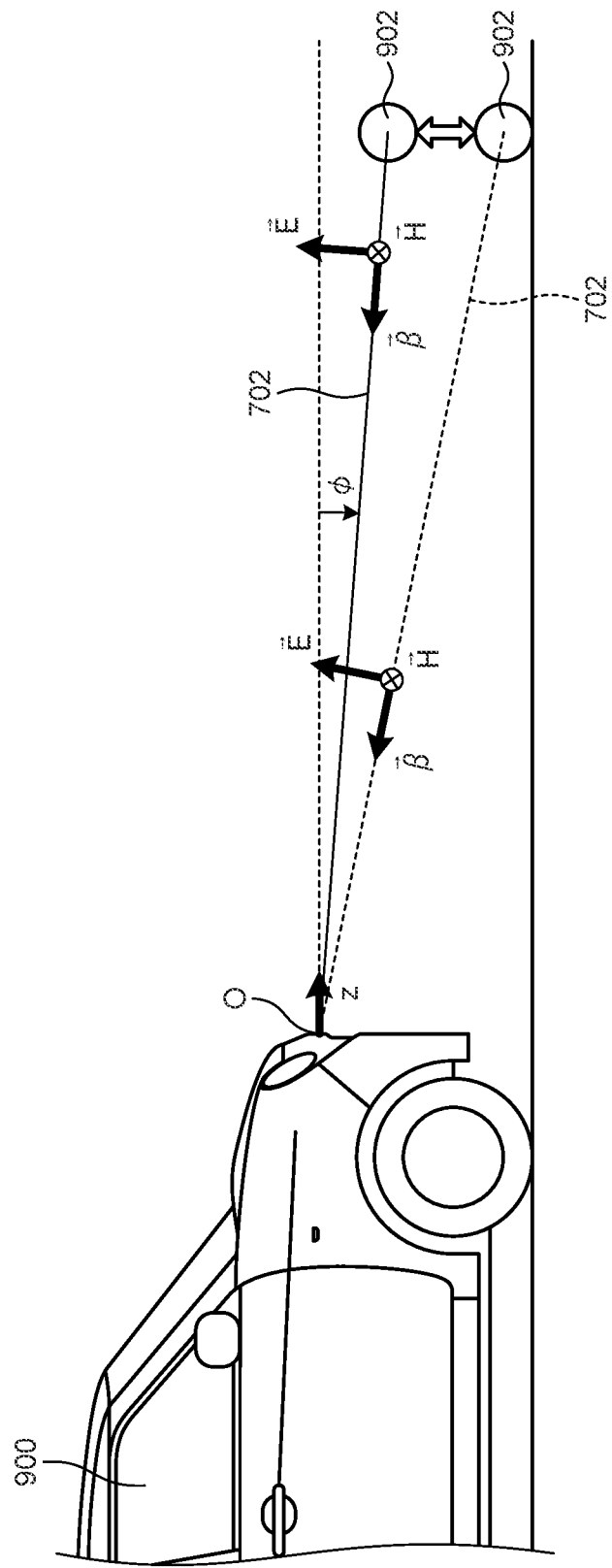
FIG. 22 is an explanatory view illustrating a method of estimating an elevation angle according to the third embodiment of the present disclosure.

Next, a system according to a third embodiment of the present disclosure will be described with reference to FIGS. 20 to 22. The system can estimate an azimuth angle θ and an elevation angle φ of an object 902. FIG. 20 is a block diagram of a system according to the present embodiment. FIG. 21 is an explanatory view illustrating a method of estimating an azimuth angle according to the present embodiment. FIG. 22 is an explanatory view illustrating a method of estimating an elevation angle according to the present embodiment.

As illustrated in FIG. 20, a system 300 according to the present embodiment further includes the above-described radar antenna 100 and a module 400. Hereinafter, details of the configuration of the module 400 will be described. Note that the radar antenna 100 according to the present embodiment is similar to the radar antennas 100 of the above-described first and second embodiments, and thus the description thereof is omitted here.

(Transmission Unit 402)

A transmission unit 402 is a functional unit that transmits a transmission wave to the object 902 via an antenna element 120a. Specifically, the transmission unit 402 can transmit, for example, a chirp signal whose frequency changes with time. For example, the transmission unit 402 can include a phase locked loop (PLL) synthesizer including a crystal oscillator (not illustrated), a phase comparator (not illustrated), a frequency divider (not illustrated), a charge pump (not illustrated), a voltage controlled oscillator (not illustrated), and a loop filter (not illustrated).

(Reception Units 404a and 404b)

A reception unit 404a (first reception unit) receives a polarization component in the X-axis direction or the Y-axis direction of a reflected wave from the object 902 via the antenna element 120a. Furthermore, a reception unit 404b (second reception unit) receives a polarization component in the Z-axis direction of a reflected wave from the object 902 via the antenna element 120a. The reception units 404a and 404b can include, for example, an amplifier (not illustrated), a mixer (not illustrated), and the like configured by combining semiconductor elements such as transistors. More specifically, the reception units 404a and 404b may include a mixer. For example, a received reflected wave and a transmission wave from the above-described transmission unit 402 are input to the mixer. The mixer can acquire a signal having a frequency corresponding to the sum and the difference of the frequency of the reflected wave and the frequency of the transmission wave.

(Signal Processing Unit 406)

A signal processing unit 406 can process a signal for each of polarization components received at the reception units 404a and 404b. The signal processing unit 406 can include, for example, an arithmetic theory calculating element such as a digital signal processor (DSP), a field-programmable gate array (FPGA), and a microcomputer. When polarization components in the X-axis direction and the Z-axis direction of a reception wave can be acquired, the signal processing unit 406 can estimate the azimuth angle θ of the object 902. When polarization components in the Y-axis direction and the Z-axis direction of the reception wave can be acquired, the signal processing unit 406 can estimate the elevation angle φ of the object 902. Note that details of estimation of the azimuth angle θ and the elevation angle φ according to the present embodiment will be described later. Moreover, the signal processing unit 406 can estimate the distance and speed (e.g., FMCW type radar) to the object 902, and estimate the intensity of a reflected wave.

(Estimation of Azimuth Angle)

In the present embodiment, the signal processing unit 406 can estimate the azimuth angle θ based on polarization components received at the reception units 404a and 404b. The azimuth angle θ is formed by a center line (Z-axis in FIG. 21) and a line segment 700 as illustrated in FIG. 21. The center line penetrates the center O of the main flat surface 112 of the antenna substrate 110 along a direction perpendicular to the main flat surface 112. The line segment 700 connects the center O and the object 902. Specifically, the radar antenna 100 according to the present embodiment enables polarization components in the X-axis direction and the Z-axis direction to be separately grasped. Moreover, the relation between the intensity of the polarization component in each polarization direction and the azimuth angle θ can be expressed by the following mathematical expression (2). Therefore, if $\alpha_z(\theta)/\alpha_x(\theta)$ is a monotonic function, the azimuth angle θ can be estimated. Note that $\alpha_z(\theta)$ and $\alpha_x(\theta)$ in the expression (2) are coefficients reflecting the characteristics in each direction of the radar antenna 100.

$$\left. \begin{array}{l} E_x = \alpha_x(\theta)|\vec{E}|\cos\theta \\ E_z = \alpha_z(\theta)|\vec{E}|\sin\theta \\ \dfrac{E_z}{E_x} = \dfrac{\alpha_z(\theta)}{\alpha_x(\theta)}\tan\theta \end{array} \right\} \quad (2)$$

(Estimation of Elevation Angle)

In the present embodiment, the signal processing unit 406 can estimate the elevation angle φ based on polarization components received at the reception units 404a and 404b. The elevation angle φ is formed by a horizontal plane and a line segment 702 as illustrated in FIG. 22. A center line (Z-axis in FIG. 22) extends in the horizontal plane. The center line penetrates the center O of the main flat surface 112 of the antenna substrate 110 along a direction perpendicular to the main flat surface 112. The line segment 702 connects the center O and the object 902.

Specifically, in the present embodiment, the radar antenna 100 enables polarization components in the Y-axis direction and the Z-axis direction to be separately grasped. Then, in the present embodiment, a polarization component in the Z-axis direction can be grasped alone. As illustrated in FIG. 22, the polarization component in the Z-axis direction changes in accordance with the height (elevation angle φ) of the object 902 and the distance (distance on horizontal plane) to the object 902. Incidentally, when the antenna element 120b and the object 902 have the same height, that is, when the elevation angle φ is 0 degrees, the polarization component in the Z-axis direction monotonically changes depending on the distance to the object 902. In contrast, when the antenna element 120b and the object 902 does not have the same height, that is, when the elevation angle φ is not 0 degrees, the polarization component in the Z-axis direction changes in accordance with both the height (elevation angle φ) of the object 902 and the distance to the object 902. Therefore, for example, when the radar antenna 100 is provided on the front of the running vehicle 900, an antenna element 120b that grasps a polarization component monotonically changing in accordance with a running distance of the vehicle 900 among antenna elements 120b that grasp a polarization component in the Z-axis direction has the same height as the object 902. Then, in the present embodiment, when the radar antenna 100 is provided on the front of the running vehicle 900, the height (elevation angle φ) of the object 902 can be estimated from the relation between the position (height with respect to horizontal plane) of each antenna element 120b that grasps a polarization component in the Z-axis direction and the change in the polarization component in the Z-axis direction grasped by each antenna element 120b.

Note that, in the present embodiment, the configuration of the system 300 is not limited to the configuration as illustrated in FIG. 20. Here, a case where the radar antenna 100 includes the antenna element 120a, the antenna element 120b, and the antenna element (third antenna element) (not illustrated) will be discussed. The antenna element 120a can receive a polarization component in the X-axis direction. The antenna element 120b can receive a polarization component in the Z-axis direction. The antenna element (third antenna element) can receive a polarization component in the Y-axis direction. In such a case, the module 400 according to the present embodiment may include the reception unit 404a and a reception unit (third reception unit) (not illustrated) in addition to the reception unit 404b. The reception unit 404a can receive a polarization component in the X-axis direction via the antenna element 120a capable of receiving a polarization component in the X. The reception unit (third reception unit) can receive a polarization component in the Z-axis direction via an antenna element capable of receiving a polarization component in the Y-axis direction. The reception unit 404b can receive a polarization component in the Z-axis direction. Then, in the present embodiment, in such a case, the signal processing unit 406 may process a signal for the above-described polarization components received at the reception unit capable of receiving a polarization component in the Z-axis direction. Furthermore, the transmission unit 402 may transmit a transmission wave to the object 902 not only via the antenna element 120a but via the antenna element 120b or the like. That is, in the present embodiment, the combination of the antenna element, the reception unit, and the transmission unit is not particularly limited.

3. Application Example

3.1 Moving Object

The technology according to the present disclosure can be applied to various products. For example, the technology according to the present disclosure may be achieved as an apparatus mounted in a moving object of any of an automobile, an electric vehicle, a hybrid electric vehicle, a motorcycle, a bicycle, a personal mobility, an airplane, a drone, a ship, a robot (mobile robot), a construction machine, an agricultural machine (tractor), and the like. Note that, here, the drone is a small airplane, and refers to an apparatus that has an autonomous flight function, an autonomous posture control function, and the like and can fly in three-dimensional space without a pilot in terms of structure.

Figure 23:
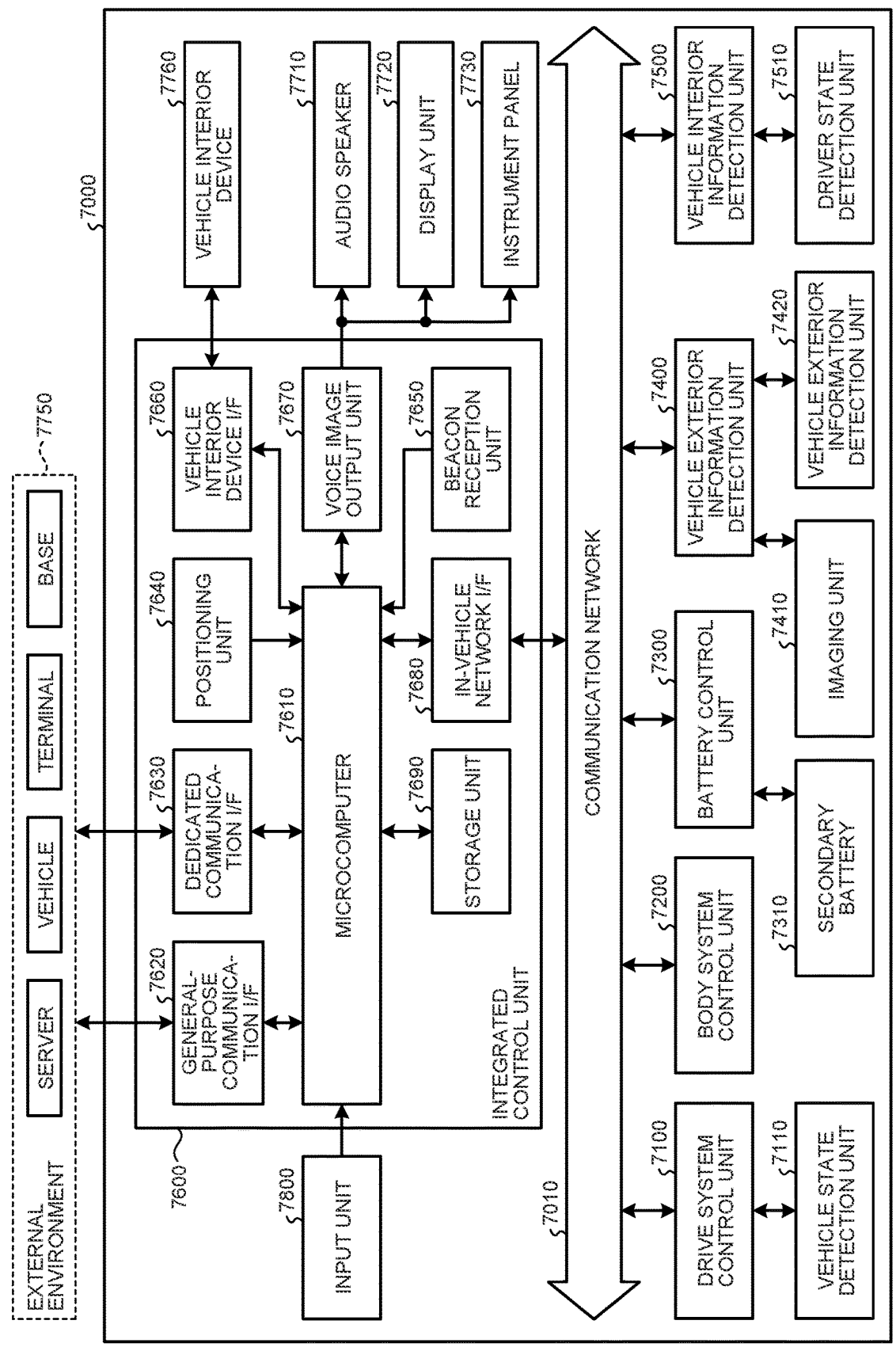
FIG. 23 is a block diagram illustrating one example of a schematic configuration of a vehicle control system.

FIG. 23 is a block diagram illustrating an example of a schematic configuration of a vehicle control system 7000. The vehicle control system 7000 is one example of a moving object control system to which the technology according to the present disclosure can be applied. The vehicle control system 7000 includes a plurality of electronic control units connected via a communication network 7010. In the example in FIG. 23, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010 connecting the plurality of control units may be an in-vehicle communication network in conformity with any standard such as a controller area network (CAN), a local interconnect network (LIN), a local area network (LAN), and FlexRay (registered trademark).

Each control unit includes a microcomputer, a storage unit, and a drive circuit. The microcomputer performs arithmetic processing in accordance with various programs. The storage unit stores a program to be executed by the microcomputer, a parameter to be used in various arithmetic operations, and the like. The drive circuit drives various apparatuses to be controlled. Each control unit includes a network I/F and a communication I/F. The network I/F is used for communicating with another control unit via the communication network 7010. The communication I/F is used for communicating with an apparatus, a sensor, or the like inside/outside a vehicle by wired communication or wireless communication. FIG. 23 illustrates a microcomputer 7610, a general-purpose communication I/F 7620, a dedicated communication I/F 7630, a positioning unit 7640, a beacon reception unit 7650, a vehicle interior device I/F 7660, a voice image output unit 7670, an in-vehicle network I/F 7680, and a storage unit 7690 as functional configurations of the integrated control unit 7600. The other control units similarly include a microcomputer, a communication I/F, a storage unit, and the like.

The drive system control unit 7100 controls the operation of an apparatus related to a drive system of a vehicle in accordance with the various programs. For example, the drive system control unit 7100 functions as a control apparatus for a drive force generation apparatus, a drive force transmission mechanism, a steering mechanism, a braking apparatus, and the like. The drive force generation apparatus generates vehicle drive force, and includes an internal combustion engine, a drive motor, and the like. The drive force transmission mechanism transmits the drive force to a wheel. The steering mechanism adjusts a steering angle of the vehicle. The braking apparatus generates braking force of the vehicle. The drive system control unit 7100 may have a function as a control apparatus such as an antilock brake system (ABS) and an electronic stability control (ESC).

A vehicle state detection unit 7110 is connected to the drive system control unit 7100. The vehicle state detection unit 7110 includes at least one of, for example, a gyro sensor, an acceleration sensor, and sensors for detecting an accelerator pedal operation amount, a brake pedal operation amount, a steering wheel steering angle, an engine speed, a wheel rotation speed, and the like. The gyro sensor detects an angular speed of axial rotation movement of a vehicle body. The acceleration sensor detects an acceleration of the vehicle. The drive system control unit 7100 performs arithmetic processing by using a signal input from the vehicle state detection unit 7110, and controls an internal combustion engine, a drive motor, an electric power steering apparatus, a brake apparatus, and the like.

The body system control unit 7200 controls operations of various apparatuses mounted in the vehicle body in accordance with the various programs. For example, the body system control unit 7200 functions as a control apparatus for a keyless entry system, a smart key system, a power window apparatus, and various lamps such as a head lamp, a back lamp, a brake lamp, a blinker, and a fog lamp. In this case, radio waves transmitted from a portable device substituted for a key or signals of various switches can be input to the body system control unit 7200. The body system control unit 7200 receives inputs of the radio waves or signals, and controls a door lock apparatus, a power window apparatus, a lamp, and the like of the vehicle.

The battery control unit 7300 controls a secondary battery 7310, which is a power supply source for the drive motor, in accordance with the various programs. For example, information on a battery temperature, a battery output voltage, a battery remaining capacity, and the like is input from a battery apparatus provided with the secondary battery 7310 to the battery control unit 7300. The battery control unit 7300 performs arithmetic processing by using these signals, and performs temperature adjustment control on the secondary battery 7310 or control on a cooling apparatus and the like provided in the battery apparatus.

The vehicle exterior information detection unit 7400 detects information outside a vehicle mounted with the vehicle control system 7000. For example, at least one of an imaging unit 7410 and a vehicle exterior information detection unit 7420 is connected to the vehicle exterior information detection unit 7400. The imaging unit 7410 includes at least one of a time of flight (ToF) camera, a stereo camera, a monocular camera, an infrared camera, and other cameras. The vehicle exterior information detection unit 7420 includes at least one of, for example, an environment sensor and a surrounding information detection sensor. The environment sensor detects present weather or a meteorological phenomenon. The surrounding information detection sensor detects a vehicle, an obstacle, a pedestrian, and the like around the vehicle mounted with the vehicle control system 7000.

The environment sensor may be at least one of, for example, a raindrop sensor, a fog sensor, a sunshine sensor, and a snow sensor. The raindrop sensor detects rainy weather. The fog sensor detects fog. The sunshine sensor detects a degree of sunshine. The snow sensor detects snowfall. The surrounding information detection sensor can be a moving object mounted radar antenna system according to the technology of the present disclosure and the like. The imaging unit 7410 and the vehicle exterior information detection unit 7420 may be provided as independent sensors or apparatuses, or may be provided as apparatuses in which a plurality of sensors or apparatuses is integrated.

Figure 24:
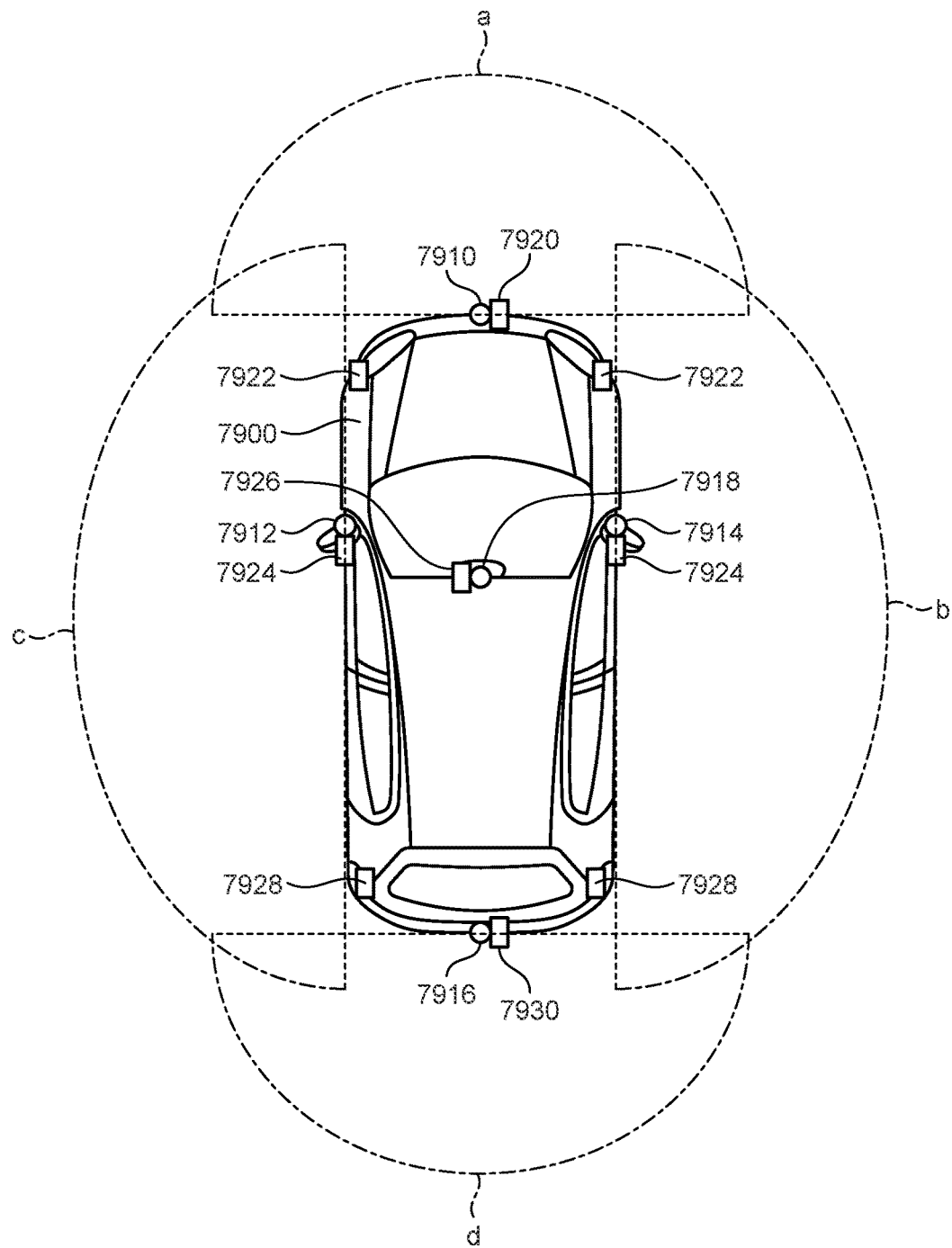
FIG. 24 is an explanatory view illustrating one example of installation positions of a vehicle exterior information detection unit and an imaging unit.

Here, FIG. 24 illustrates an example of installation positions of the imaging unit 7410 and the vehicle exterior information detection unit 7420. Imaging units 7910, 7912, 7914, 7916, and 7918 are provided at least one of positions of a front nose, a side mirror, a rear bumper, a back door, and an upper portion of a vehicle interior windshield of a vehicle 7900. The imaging units 7910 and 7918 mainly acquire an image of the front of the vehicle 7900. The imaging unit 7910 is provided on the front nose. The imaging unit 7918 is provided at the upper portion of the vehicle interior windshield. The imaging units 7912 and 7914 mainly acquire an image of the side of the vehicle 7900. The imaging units 7912 and 7914 are provided on the side mirror. The imaging unit 7916 mainly acquires an image of the rear of the vehicle 7900. The imaging unit 7916 is provided in the rear bumper or the back door. The imaging unit 7918 is mainly used for detecting a preceding vehicle, a pedestrian, an obstacle, a traffic light, a traffic sign, a lane, and the like. The imaging unit 7918 is provided on the upper portion of the vehicle interior windshield.

Note that FIG. 24 illustrates one example of imaging ranges of the imaging units 7910, 7912, 7914, and 7916. An imaging range a is an imaging range of the imaging unit 7910 provided on the front nose. Imaging ranges b and c are imaging ranges of the imaging units 7912 and 7914 provided at the side mirrors. An imaging range d is an imaging range of the imaging unit 7916 provided on the rear bumper or the back door. For example, an overhead image of the vehicle 7900 viewed from above can be obtained by superimposing pieces of data of images captured by the imaging units 7910, 7912, 7914, and 7916.

As described above, vehicle exterior information detection units 7920, 7922, 7924, 7926, 7928, and 7930 can be moving object mounted radar antenna systems according to the technology of the present disclosure and the like. The vehicle exterior information detection units 7920, 7922, 7924, 7926, 7928, and 7930 are provided on the front, rear, sides, corners of the vehicle 7900 and the upper portion of the vehicle interior windshield. Furthermore, the vehicle exterior information detection units 7920, 7926, and 7930 can be the moving object mounted radar antenna systems according to the technology of the present disclosure and the like. The vehicle exterior information detection units 7920, 7926, and 7930 are provided on the front nose, rear bumper, and back door of the vehicle 7900 and the upper portion of the vehicle interior windshield. For example, when the vehicle exterior information detection unit 7920 is a moving object mounted radar antenna according to the technology of the present disclosure, the main flat surface 112 of the antenna substrate 110 is installed so as to be parallel to the front of the vehicle 7900, and the Z-axis direction is the advancing direction of the vehicle 7900. These vehicle exterior information detection units 7920 to 7930 are mainly used for detecting a preceding vehicle, a pedestrian, an obstacle, and the like.

Returning to FIG. 23, the description will be continued. The vehicle exterior information detection unit 7400 causes the imaging unit 7410 to capture an image of the outside of the vehicle, and receives data of the captured image. Furthermore, the vehicle exterior information detection unit 7400 receives detection information from the connected vehicle exterior information detection unit 7420. When the vehicle exterior information detection unit 7420 is a moving object mounted radar antenna system according to the technology of the present disclosure and the like, the vehicle exterior information detection unit 7400 transmits an electromagnetic wave and the like, and receives information on a received reflected wave. The vehicle exterior information detection unit 7400 may perform object detection processing or distance detection processing for a person, a vehicle, an obstacle, a sign, a character on a road, and the like based on the received information. The vehicle exterior information detection unit 7400 may perform environment recognition processing of recognizing rainfall, fog, road surface conditions, and the like based on the received information. The vehicle exterior information detection unit 7400 may calculate a distance to an object outside the vehicle and the position of the object based on the received information or a reflected wave.

Furthermore, the vehicle exterior information detection unit 7400 may perform image recognition processing of recognizing a person, a vehicle, an obstacle, a sign, a character on a road, and the like or distance detection processing based on the received image data. The vehicle exterior information detection unit 7400 may perform processing such as distortion correction and alignment on the received image data, and combine pieces of data of images captured by different imaging units 7410 to generate an overhead image or a panoramic image. The vehicle exterior information detection unit 7400 may perform viewpoint conversion processing by using the pieces of data of the images captured by the different imaging units 7410.

The vehicle interior information detection unit 7500 detects information on the inside of the vehicle. For example, a driver state detection unit 7510 is connected to the vehicle interior information detection unit 7500. The driver state detection unit 7510 detects the state of a driver. The driver state detection unit 7510 may include a camera, a biological sensor, a microphone, and the like. The camera images the driver. The biological sensor detects biological information on the driver. The microphone collects voice inside the vehicle. The biological sensor is provided on, for example, a seat surface, a steering wheel, or the like, and detects biological information on an occupant sitting on a seat or a driver grasping the steering wheel. The vehicle interior information detection unit 7500 may calculate the degree of fatigue or concentration of the driver or may determine whether the driver is falling asleep based on the detection information input from the driver state detection unit 7510. The vehicle interior information detection unit 7500 may perform processing such as noise canceling processing on a signal of collected voice.

The integrated control unit 7600 controls the overall operation in the vehicle control system 7000 in accordance with the various programs. An input unit 7800 is connected to the integrated control unit 7600. The input unit 7800 is achieved by an apparatus that can be operated by an occupant for input, such as a touch panel, a button, a microphone, a switch, and a lever. Data obtained by recognizing voice input by the microphone may be input to the integrated control unit 7600. For example, the input unit 7800 may be a remote control apparatus using infrared rays or other radio waves, or may be an external connection device, such as a mobile phone or a personal digital assistant (PDA), supporting the operation of the vehicle control system 7000. The input unit 7800 may be, for example, a camera. In the case, an occupant can input information by gesture.

Alternatively, data obtained by detecting the movement of a wearable device worn by the occupant may be input. Moreover, for example, the input unit 7800 may include an input control circuit and the like, which generates an input signal with the above-described input unit 7800 based on information input by the occupant and the like and outputs the input signal to the integrated control unit 7600. The occupant and the like inputs various pieces of data and gives a processing operation instruction to the vehicle control system 7000 by operating the input unit 7800.

The storage unit 7690 may include a read only memory (ROM) and a random access memory (RAM). The ROM stores various programs to be executed by a microcomputer. The RAM stores various parameters, arithmetic results, sensors, and the like. Furthermore, the storage unit 7690 may be achieved by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. The general-purpose communication I/F 7620 may be implemented with a cellular communication protocol or other wireless communication protocols. The cellular communication protocol includes a global system of mobile communications (GSM) (registered trademark), WiMAX (registered trademark), long term evolution (LTE) (registered trademark), and LTE-Advanced (LTE-A). The other wireless communication protocols include wireless LAN (also referred to as Wi-Fi (registered trademark)) and Bluetooth (registered trademark). For example, the general-purpose communication I/F 7620 may be connected to a device (e.g., application server and control server) existing on an external network (e.g., the Internet, cloud network, and a company-specific network) via a base station or an access point. Furthermore, the general-purpose communication I/F 7620 may be connected to a terminal (e.g., terminal of driver, pedestrian, or shop, and machine type communication (MTC) terminal) existing in the vicinity of the vehicle by using, for example, peer to peer (P2P) technology.

The dedicated communication I/F 7630 supports a communication protocol designed for use in a vehicle. For example, the dedicated communication I/F 7630 may be implemented with a standard protocol such as wireless access in vehicle environment (WAVE), which is a combination of a lower layer IEEE802.11p and an upper layer IEEE1609, dedicated short range communications (DSRC), and a cellular communication protocol. The dedicated communication I/F 7630 typically performs V2X communication, which is a concept including one or more of vehicle to vehicle communication, vehicle to infrastructure communication, vehicle to home communication, and vehicle to pedestrian communication.

The positioning unit 7640 receives, for example, a global navigation satellite system (GNSS) signal from a GNSS satellite (e.g., global positioning system (GPS) signal from GPS satellite), executes positioning, and generates position information including the latitude, longitude, and altitude of the vehicle. Note that the positioning unit 7640 may identify the current position by exchanging signals with a wireless access point, or may acquire position information from a terminal such as a mobile phone, a PHS, and a smartphone having a positioning function.

The beacon reception unit 7650 receives, for example, a radio wave or an electromagnetic wave transmitted from a wireless station or the like installed on a road, and acquires information on a current position, a traffic jam, a closed road, a required time, and the like. Note that the above-described dedicated communication I/F 7630 may include the function of the beacon reception unit 7650.

The vehicle interior device I/F 7660 is a communication interface that mediates the connection between the microcomputer 7610 and various vehicle interior devices 7760 existing in the vehicle. The vehicle interior device I/F 7660 may establish wireless connection by using a wireless communication protocol such as wireless LAN, Bluetooth (registered trademark), near field communication (NFC), and wireless USB (WUSB). Furthermore, the vehicle interior device I/F 7660 may establish wired connection such as a universal serial bus (USB), a high-definition multimedia interface (HDMI) (registered trademark), and a mobile high-definition link (MHL) via a connection terminal (not illustrated) (and cable if necessary). The vehicle interior devices 7760 may include at least one of a mobile device and a wearable device of an occupant and an information device to be carried in or attached to the vehicle. Furthermore, the vehicle interior devices 7760 may include a navigation apparatus that searches for a route to any destination. The vehicle interior device I/F 7660 exchanges a control signal or a data signal with the vehicle interior devices 7760.

The in-vehicle network I/F 7680 mediates the communication between the microcomputer 7610 and the communication network 7010. The in-vehicle network I/F 7680 transmits and receives signals and the like in accordance with a predetermined protocol supported by the communication network 7010.

The microcomputer 7610 of the integrated control unit 7600 controls the vehicle control system 7000 in accordance with the various programs based on information acquired via at least one of the general-purpose communication I/F 7620, the dedicated communication I/F 7630, the positioning unit 7640, the beacon reception unit 7650, the vehicle interior device I/F 7660, and the in-vehicle network I/F 7680. For example, the microcomputer 7610 may calculate a control target value of the drive force generation apparatus, the steering mechanism, or the braking apparatus based on acquired information on the inside or outside of the vehicle, and output a control command to the drive system control unit 7100. For example, the microcomputer 7610 may perform cooperative control for implementing a function of an advanced driver assistance system (ADAS) including collision avoidance or impact mitigation of the vehicle, follow-up traveling based on an inter-vehicle distance, vehicle speed maintenance traveling, vehicle collision warning, vehicle lane departure warning, and the like. Furthermore, the microcomputer 7610 may perform cooperative control for the purpose of automatic driving in which autonomous traveling is performed without depending on the operation of the driver and the like by controlling the drive force generation apparatus, the steering mechanism, the braking apparatus, and the like based on the acquired information on the surroundings of the vehicle.

The microcomputer 7610 may generate information on the three-dimensional distance between the vehicle and an object such as a structure and a person around the vehicle based on information acquired via at least one of the general-purpose communication I/F 7620, the dedicated communication I/F 7630, the positioning unit 7640, the beacon reception unit 7650, the vehicle interior device I/F 7660, and the in-vehicle network I/F 7680, and create local map information including information on the surroundings of the current position of the vehicle. Furthermore, the microcomputer 7610 may predict danger such as vehicle collision, approach of a pedestrian or the like, and entry into a closed road based on the acquired information, and generate a warning signal. The warning signal may generate warning sound, or turn on a warning lamp.

The voice image output unit 7670 transmits an output signal of at least one of voice and an image to an output apparatus capable of visually or auditorily notifying an occupant of the vehicle or the outside of the vehicle of information. In the example of FIG. 23, an audio speaker 7710, a display unit 7720, and an instrument panel 7730 are illustrated as the output apparatuses. The display unit 7720 may include at least one of, for example, an on-board display and a head-up display. The display unit 7720 may have an augmented reality (AR) display function. The output apparatus may be an apparatus other than these apparatuses, such as a wearable device including a headphone, an eyeglass type display worn by an occupant, and the like, a projector, and a lamp. When the output apparatus is a display apparatus, the display apparatus visually displays results obtained by various pieces of processing performed by the microcomputer 7610 or information received from another control unit in various formats such as text, an image, a table, and a graph. Furthermore, when the output apparatus is a voice output apparatus, the voice output apparatus converts an audio signal including data on reproduced voice and acoustic data into an analog signal, and auditorily outputs the analog signal.

Note that, in the example in FIG. 23, at least two control units connected via the communication network 7010 may be integrated as one control unit. Alternatively, each control unit may include a plurality of control units. Moreover, the vehicle control system 7000 may include another control unit (not illustrated). Furthermore, in the above description, another control unit may have a part or all of the function of any control unit. That is, predetermined arithmetic processing may be performed by any control unit as long as information is transmitted and received via the communication network 7010. Similarly, a sensor or an apparatus connected to any control unit may be connected to another control unit. A plurality of control units may mutually transmit and receive detection information via the communication network 7010.

3.2 Wearable Device

Figure 25:
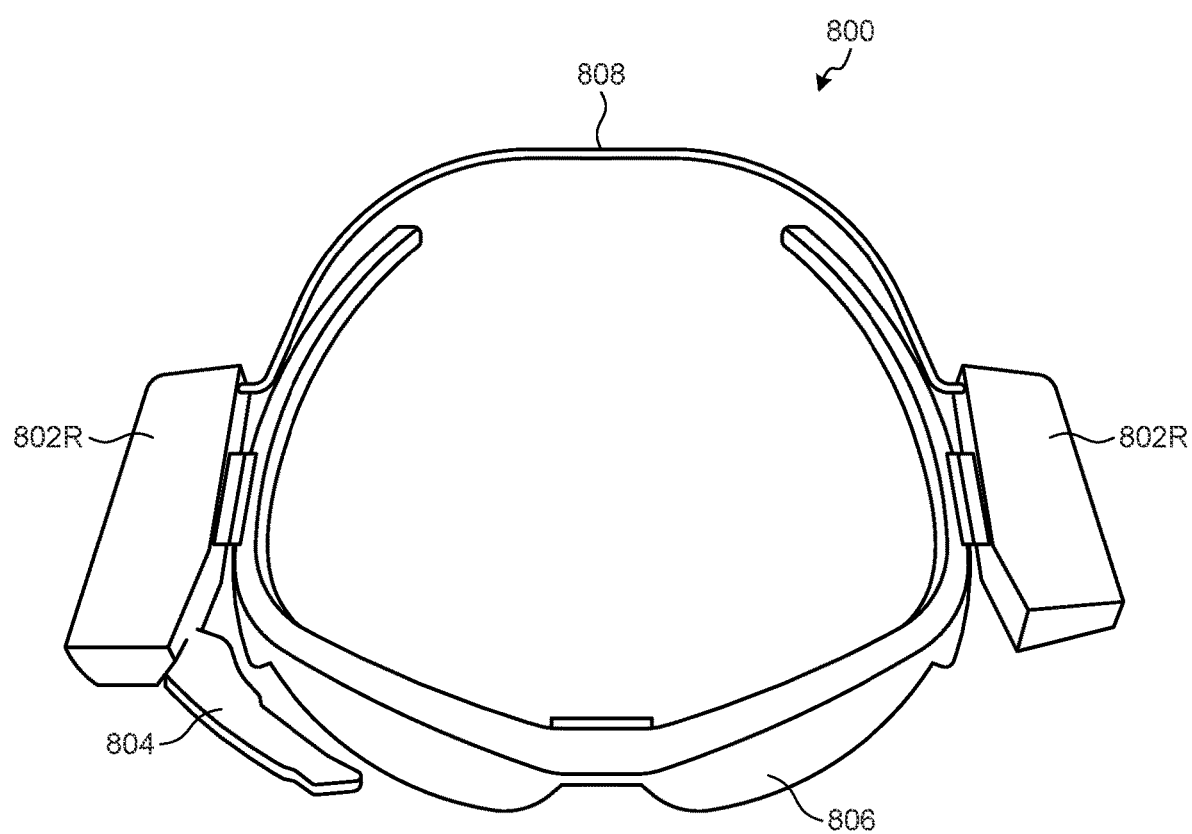
FIG. 25 is an explanatory view illustrating one example of the appearance of a wearable device.

Furthermore, a moving object mounted radar antenna system according to the technology of the present disclosure and the like may be mounted in a wearable device mounted on a body of a user (person) or an animal. FIG. 25 is an explanatory view illustrating one example of the appearance of a wearable device.

A wearable device 800 in FIG. 25 is an eyewear type wearable device. The wearable device 800 includes left and right main body portions 802L and 802R, a display 804, a lens 806, and a neck band 808. The neck band 808 connects the left and right main body portions 802L and 802R. For example, the main body portions 802L and 802R incorporate at least a part of a moving object mounted radar antenna system according to the technology of the present disclosure and the like. For example, the radar antenna 100 according to the technology of the present disclosure can be installed in any of the main body portions 802L and 802R such that the main flat surface 112 of the radar antenna 100 is parallel to the front of a user. In this case, the Z-axis direction is the advancing direction of the user. Furthermore, the display 804 includes an organic electro luminescence (EL) display. Therefore, the user can see the surroundings through the lens 806 with the wearable device 800 worn by the user, and can also see the screen displayed on the display 804 with one eye. Therefore, the user can recognize information on an obstacle and the like detected by the moving object mounted radar antenna system according to the technology of the present disclosure and the like with the screen displayed on the display 804.

The main body portions 802L and 802R incorporate a main control unit (not illustrated) capable of controlling each block of the wearable device 800. The main control unit may be achieved by hardware such as a central processing unit (CPU), a read only memory (ROM), and a random access memory (RAM). The main body portions 802L and 802R can also incorporate a communication unit (not illustrated) capable of transmitting and receiving information to and from an external apparatus. The communication unit is achieved by a communication device such as a communication antenna, a transmission/reception circuit, and a port.

Moreover, the wearable device 800 may include, for example, a speaker, an earphone, a light emitting element, a vibration module, and the like in order to output various pieces of information to the user by voice, light, vibration, and the like. Furthermore, the wearable device 800 may further include an input unit that receives input of data and a command to the wearable device 800. The input unit is achieved by a touch panel, a button, a switch, a key, a keyboard, a microphone, an image sensor, and the like.

Note that the wearable device 800 is not limited to the form in FIG. 25, and may be a wearable device of various types such as a head mounted display (HMD) type, an ear device type, an anklet type, a bracelet type, a collar type, a pad type, a batch type, and a cloth type.

Furthermore, a moving object mounted radar antenna system according to the technology of the present disclosure and the like may be mounted in a portable device carried by a user (person). Examples of the portable device include a tablet personal computer (PC), a smartphone, a mobile phone, a laptop PC, and a notebook PC.

4. Conclusion

As described above, according to the technology of the present disclosure, a radar antenna including separately arranged antenna elements having different directivities enables polarization components in a plurality of different polarization directions to be separately grasped. The position (azimuth angle and elevation angle) of an obstacle (object) can thus be accurately detected while a simple configuration is achieved. Moreover, according to the technology of the present disclosure, the viewing angle of the radar antenna can be expanded.

5. Supplements

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in claims, and it is naturally understood that these changes or modifications also belong to the technical scope of the present disclosure.

Furthermore, the effects described in the present specification are merely illustrative or exemplary ones, and are not limitations. That is, the technology according to the present disclosure can exhibit other effects obvious to those skilled in the art from the description of the present specification together with or instead of the above-described effects.

Note that the following configurations also belong to the technical scope of the present disclosure.

(1) A moving object mounted radar antenna comprising:
an antenna substrate including a main flat surface facing an object;
a first antenna element that is allowed to receive a polarization component in a first polarization direction parallel to the main flat surface;
a second antenna element that is allowed to receive a polarization component in a second polarization direction perpendicular to the main flat surface; and
a separation portion that electrically separates the first antenna element and the second antenna element,
each of the first antenna element, the second antenna element, and the separation portion being provided on the antenna substrate.

(2) The moving object mounted radar antenna according to (1),
wherein the second antenna element includes a monopole antenna element including a via that penetrates the antenna substrate along a thickness direction of the antenna substrate.

(3) The moving object mounted radar antenna according to (1),
wherein the second antenna element includes an SIW antenna element provided on the main flat surface.

(4) The moving object mounted radar antenna according to (3),
wherein the SIW antenna element is a horn antenna formed by a plurality of patterns arranged in a horn shape on the main flat surface.

(5) The moving object mounted radar antenna according to any one of (1) to (4),
wherein the first antenna element is a slot antenna element including a slot that extends along a direction perpendicular to the first polarization direction on the main flat surface.

(6) The moving object mounted radar antenna according to any one of (1) to (4),
wherein the first antenna element is a patch antenna element formed by a metal pattern that is provided on the main flat surface.

(7) The moving object mounted radar antenna according to any one of (1) to (6),
wherein the separation portion includes at least any one of a ground via electrically connected to a ground, ground wiring electrically connected to the ground, an absorption element including an absorbent material that absorbs an electromagnetic wave, and a magnetic element including a magnetic substance that acts on an electric field.

(8) The moving object mounted radar antenna according to any one of (1) to (4), further comprising
a third antenna element that is provided on the antenna substrate and that is allowed to receive a polarization component in a third polarization direction parallel to the main flat surface and orthogonal to the first polarization direction.

(9) The moving object mounted radar antenna according to (8),
wherein the third antenna element is a slot antenna element including a slot that extends along the first polarization direction on the main flat surface.

(10) The moving object mounted radar antenna according to any one of (1) to (9),
wherein the main flat surface includes:
a first region in which a plurality of first antenna elements is provided; and
a second region in which a plurality of second antenna elements is provided, and
the separation portion is located between the first region and the second region.

(11) The moving object mounted radar antenna according to (10),
wherein the second region is located around the first region.

(12) The moving object mounted radar antenna according to any one of (1) to (11), mounted on one moving object selected from a vehicle, a ship, a drone, and a robot.

(13) The moving object mounted radar antenna according to (12),
wherein the antenna substrate is installed on a front of the moving object such that the front and the main flat surface are parallel to each other, and
the second polarization direction is an advancing direction of the moving object.

(14) The moving object mounted radar antenna according to any one of (1) to (11), mounted on a wearable device worn on a body of a person or an animal or a portable device carried by a person.

(15) A module for a moving object mounted radar antenna that processes a signal from a moving object mounted radar antenna including: an antenna substrate including a main flat surface facing an object; a first antenna element that is allowed to receive a polarization component in a first polarization direction parallel to the main flat surface; a second antenna element that is allowed to receive a polarization component in a second polarization direction perpendicular to the main flat surface; and a separation portion that electrically separates the first antenna element and the second antenna element, the first antenna element, the second antenna element, and the separation portion being provided on the antenna substrate, the module comprising:
a transmission unit that transmits a transmission wave to the object;
a first reception unit that receives a polarization component in the first polarization direction of a reflected wave from the object via the first antenna element;
a second reception unit that receives a polarization component in the second polarization direction of the reflected wave from the object via the second antenna element; and a signal processing unit that processes a signal for each of the polarization components received at the first reception unit and the second reception unit.

(16) The module for a moving object mounted radar antenna, according to (15), wherein the antenna substrate is installed on a front of a moving object such that the front and the main flat surface are parallel to each other, and the second polarization direction is an advancing direction of the moving object.

(17) The module for a moving object mounted radar antenna, according to (16), wherein the signal processing unit estimates an azimuth angle formed by a center line penetrating a center of the main flat surface along a direction perpendicular to the main flat surface and a line connecting the center and the object based on the polarization components received at the first reception unit and the second reception unit.

(18) The module for a moving object mounted radar antenna, according to (16), wherein the signal processing unit estimates an elevation angle formed by a horizontal plane in which a center line penetrating a center of the main flat surface along a direction perpendicular to the main flat surface extends and a line connecting the center and the object based on the polarization components received at the first reception unit and the second reception unit.

(19) The module for a moving object mounted radar antenna, according to any one of (15) to (18), wherein the moving object mounted radar antenna further includes a third antenna element that is allowed to receive a polarization component in a third polarization direction parallel to the main flat surface and orthogonal to the first polarization direction, the module further includes a third reception unit that receives a polarization component in the third polarization direction of the reflected wave from the object via the third antenna element, and the signal processing unit processes a signal for the polarization component received at the third reception unit.

(20) A moving object mounted radar antenna system comprising:

a moving object mounted radar antenna including: an antenna substrate including a main flat surface facing an object; a first antenna element that is allowed to receive a polarization component in a first polarization direction parallel to the main flat surface; a second antenna element that is allowed to receive a polarization component in a second polarization direction perpendicular to the main flat surface; and a separation portion that electrically separates the first antenna element and the second antenna element, the first antenna element, the second antenna element, and the separation portion being provided on the antenna substrate; and a module including: a transmission unit that transmits a transmission wave to the object; a first reception unit that receives a polarization component in the first polarization direction of a reflected wave from the object via the first antenna element; a second reception unit that receives a polarization component in the second polarization direction of the reflected wave from the object via the second antenna element; and a signal processing unit that processes a signal for each of the polarization components received at the first reception unit and the second reception unit.

REFERENCE SIGNS LIST

100 RADAR ANTENNA
110 ANTENNA SUBSTRATE
112 MAIN FLAT SURFACE
112a, 112b ANTENNA REGION
112c SEPARATION REGION
120a, 120b, 120d ANTENNA ELEMENT
120c SEPARATION ELEMENT
122, 124 VIA
126 HORN PORTION
128 WAVEGUIDE PORTION
130 DIELECTRIC LAYER
132 CONDUCTOR LAYER
200a, 200b RADIATION PATTERN
300 SYSTEM
400 MODULE
402 TRANSMISSION UNIT
404a, 404b RECEPTION UNIT
406 SIGNAL PROCESSING UNIT
700, 702 LINE SEGMENT
800 WEARABLE DEVICE
802R, 802L MAIN BODY PORTION
804 DISPLAY
806 LENS
808 NECK BAND
900 VEHICLE
902 OBJECT
O CENTER

The invention claimed is:

1. A moving object mounted radar antenna, comprising:
an antenna substrate including a main flat surface that faces an object;
a first antenna element configured to receive a polarization component in a first polarization direction parallel to the main flat surface;
a second antenna element configured to receive a polarization component in a second polarization direction perpendicular to the main flat surface;
a separation portion configured to electrically separate the first antenna element and the second antenna element; and
a third antenna element configured to receive a polarization component in a third polarization direction, wherein
the third antenna element is a slot antenna element including a slot that extends along the first polarization direction on the main flat surface, and
each of the first antenna element, the second antenna element, third antenna element, and the separation portion is on the antenna substrate.

2. The moving object mounted radar antenna according to claim 1, wherein
the second antenna element includes a monopole antenna element; and
the monopole antenna element includes a via that penetrates the antenna substrate along a thickness direction of the antenna substrate.

3. The moving object mounted radar antenna according to claim 1, wherein the second antenna element includes an SIW antenna element on the main flat surface.

4. The moving object mounted radar antenna according to claim 3, wherein the SIW antenna element is a horn antenna that includes a plurality of patterns in a horn shape on the main flat surface.

5. The moving object mounted radar antenna according to claim 1, wherein the first antenna element is a slot antenna element including a slot that extends along a direction perpendicular to the first polarization direction on the main flat surface.

6. The moving object mounted radar antenna according to claim 1, wherein the first antenna element is a patch antenna element that includes a metal pattern on the main flat surface.

7. The moving object mounted radar antenna according to claim 1, wherein the separation portion includes at least one of a ground via electrically connected to a ground, ground wiring electrically connected to the ground, an absorption element including an absorbent material configured to absorb an electromagnetic wave, or a magnetic element including a magnetic substance configured to act on an electric field.

8. The moving object mounted radar antenna according to claim 1, wherein
the third polarization direction is parallel to the main flat surface and orthogonal to the first polarization direction.

9. The moving object mounted radar antenna according to claim 1, wherein
the main flat surface includes:
a first region in which that includes a plurality of first antenna elements; and
a second region in which that includes a plurality of second antenna elements; and
the separation portion is located between the first region and the second region.

10. The moving object mounted radar antenna according to claim 9, wherein the second region is around the first region.

11. The moving object mounted radar antenna according to claim 1, mounted on one moving object selected from a vehicle, a ship, a drone, and a robot.

12. The moving object mounted radar antenna according to claim 11, wherein
the antenna substrate is installed on a front of the moving object such that the front and the main flat surface are parallel, and
the second polarization direction is an advancing direction of the moving object.

13. The moving object mounted radar antenna according to claim 1, wherein
the moving object mounted radar antenna is mounted on one of a wearable device or a portable device,
the wearable device is wearable by a body of a person or an animal or a portable device carried by a person.

14. A module, comprising:
a transmission unit configured to transmit a transmission wave to an object, wherein
the module is configured to process a signal from a moving object mounted radar antenna, and
the moving object mounted radar antenna includes:
an antenna substrate including a main flat surface that faces the object,
a first antenna element configured to receive a polarization component in a first polarization direction parallel to the main flat surface,
a second antenna element configured to receive a polarization component in a second polarization direction perpendicular to the main flat surface; and
a separation portion configured to electrically separate the first antenna element and the second antenna element, wherein the first antenna element, the second antenna element, and the separation portion are on the antenna substrate;
a first reception unit configured to receive a first polarization component in the first polarization direction of a reflected wave via the first antenna element, wherein the reflected wave is received from the object;
a second reception unit configured to receive a second polarization component in the second polarization direction of the reflected wave via the second antenna element; and
a signal processing unit configured to process a signal for each of the first polarization component and the second polarization component.

15. The module, according to claim 14, wherein
the antenna substrate is on a front of a moving object such that the front and the main flat surface are parallel, and
the second polarization direction is an advancing direction of the moving object.

16. The module, according to claim 15, wherein
the signal processing unit is further configured to estimate an azimuth angle based on the received first polarization component and the second polarization component, and
the azimuth angle is between a center line that penetrates a center of the main flat surface along a direction perpendicular to the main flat surface and a line that connects the center and the object.

17. The module, according to claim 15, wherein
the signal processing unit is further configured to estimate an elevation angle based on the received first polarization component and the second polarization component, and
the elevation angle is between formed by a horizontal plane in which a center line that penetrates a center of the main flat surface along a direction perpendicular to the main flat surface extends and a line that connects the center and the object.

18. The module, according to claim 14, wherein
the moving object mounted radar antenna further includes a third antenna element configured to receive a polarization component in a third polarization direction parallel to the main flat surface and orthogonal to the first polarization direction,
the module further includes a third reception unit configured to receive a third polarization component in the third polarization direction of the reflected wave via the third antenna element, and
the signal processing unit is further configured to process a signal for the received third polarization component.

19. A moving object mounted radar antenna system, comprising:
a moving object mounted radar antenna including:
an antenna substrate including a main flat surface that faces an object;
a first antenna element configured to receive a polarization component in a first polarization direction parallel to the main flat surface;
a second antenna element configured to receive a polarization component in a second polarization direction perpendicular to the main flat surface; and
a separation portion configured to electrically separate the first antenna element and the second antenna element, wherein the first antenna element, the second antenna element, and the separation portion are on the antenna substrate; and
a module including:
a transmission unit configured to transmit a transmission wave to the object;
a first reception unit configured to receive a first polarization component in the first polarization direction of a reflected wave via the first antenna element, wherein the reflected wave is received from the object;
a second reception unit configured to receive a second polarization component in the second polarization direction of the reflected wave via the second antenna element; and
a signal processing unit configured to process a signal for each of the first polarization component and the second polarization component.

* * * * *